US012227052B2

(12) United States Patent
Al Sakka et al.

(10) Patent No.: US 12,227,052 B2
(45) Date of Patent: Feb. 18, 2025

(54) SUSPENSION SYSTEM WITH MULTIPLE WORKING MODES

(71) Applicant: TENNECO AUTOMOTIVE OPERATING COMPANY, INC., Lake Forest, IL (US)

(72) Inventors: Monzer Al Sakka, Sint-Truiden (BE); Miguel Dhaens, Lommel (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 727 days.

(21) Appl. No.: 17/435,191

(22) PCT Filed: Apr. 15, 2020

(86) PCT No.: PCT/US2020/028262
§ 371 (c)(1),
(2) Date: Aug. 31, 2021

(87) PCT Pub. No.: WO2020/214666
PCT Pub. Date: Oct. 22, 2020

(65) Prior Publication Data
US 2022/0144035 A1    May 12, 2022

Related U.S. Application Data

(60) Provisional application No. 62/834,049, filed on Apr. 15, 2019.

(51) Int. Cl.
*B60G 17/056* (2006.01)
*B60G 17/005* (2006.01)
(Continued)

(52) U.S. Cl.
CPC ......... *B60G 17/056* (2013.01); *B60G 17/005* (2013.01); *B60G 17/016* (2013.01);
(Continued)

(58) Field of Classification Search
None
See application file for complete search history.

(56) References Cited

U.S. PATENT DOCUMENTS

| 6,264,212 B1 | 7/2001 | Timoney |
| 7,751,959 B2 | 7/2010 | Boon et al. |

(Continued)

FOREIGN PATENT DOCUMENTS

| CN | 108626294 A | 10/2018 |
| CN | 109154353 A | 1/2019 |

(Continued)

OTHER PUBLICATIONS

Chinese Office Action and Search Report regarding Patent Application No. 202080029396.6, dated Apr. 20, 2023.

(Continued)

*Primary Examiner* — Melanie Torres Williams
(74) *Attorney, Agent, or Firm* — Harness, Dickey & Pierce, P.L.C.

(57) ABSTRACT

The active suspension system includes right and left dampers, a pump, and a control valve system. Each of the right and left dampers includes a damper housing, a piston rod, and a piston that is mounted on the piston rod. The piston is arranged in sliding engagement inside the damper housing such that the piston divides the damper housing into first and second working chambers. The pump includes a pump intake and a pump outlet. The control valve system is connected in fluid communication with the first and second working chambers of the right damper, the first and second working chambers of the left damper, the pump intake, and the pump outlet. The control valve system has several different arrangements of fluid flow paths that provide different working modes for the active suspension system.

16 Claims, 19 Drawing Sheets

(51) Int. Cl.
*B60G 17/016* (2006.01)
*B60G 17/08* (2006.01)

(52) U.S. Cl.
CPC ........ *B60G 17/08* (2013.01); *B60G 2202/413* (2013.01); *B60G 2202/416* (2013.01); *B60G 2204/80* (2013.01); *B60G 2400/51* (2013.01); *B60G 2600/182* (2013.01)

(56) References Cited

U.S. PATENT DOCUMENTS

| | | | |
|---|---|---|---|
| 9,522,587 | B2 | 12/2016 | Cho |
| 2004/0113377 | A1 | 6/2004 | Klees |
| 2007/0170680 | A1* | 7/2007 | Knaap ................ B60G 17/0152 280/124.106 |
| 2007/0278752 | A1 | 12/2007 | Schedgick |
| 2014/0224606 | A1 | 8/2014 | Baales et al. |
| 2018/0345747 | A1 | 12/2018 | Boon et al. |

FOREIGN PATENT DOCUMENTS

| | | | | |
|---|---|---|---|---|
| EP | 2156970 | A1 * | 2/2010 | ........... B60G 17/015 |
| KR | 101678701 | B1 * | 12/2016 | |
| WO | 2007139380 | A1 | 12/2007 | |
| WO | 2012083663 | A1 | 6/2012 | |
| WO | 2018141049 | A1 | 8/2018 | |

OTHER PUBLICATIONS

International Search Report and Written Opinion of the International Searching Authority issued in PCT/US2020/028262, mailed on Jul. 27, 2020; ISA/KR.

* cited by examiner

SUSPENSION SYSTEM WITH MULTIPLE WORKING MODES

CROSS-REFERENCE TO RELATED APPLICATIONS

This application is a U.S. National Phase Application under 35 U.S.C. 371 of International Application No. PCT/US2020/028262, filed on Apr. 15, 2020, which claims the benefit of U.S. Provisional Application No. 62/834,049, filed on Apr. 15, 2019. The entire disclosures of the above applications are incorporated herein by reference.

FIELD

The present disclosure relates generally to suspension systems for motor vehicles and more particularly to active suspension systems that replace or augment mechanical stabilizer bars/anti-roll bars.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean during corning (i.e., in turns). The lateral acceleration the vehicle experiences in turns causes a roll moment where the vehicle will lean/squat to the right when turning left and to the left when turning right. The roll moment decreases grip and cornering performance and also can be uncomfortable to the driver and passengers. Many vehicles are equipped with stabilizer bars/anti-roll bars, which are mechanical systems that help counteract the roll moment experienced during cornering. Stabilizer bars/anti-roll bars are typically mechanical linkages that extend laterally across the width of the vehicle between the right and left dampers. When one of the dampers extends, the stabilizer bar/anti-roll bar applies a force to the opposite damper that counteracts the roll moment of the vehicle and helps to correct the roll angle to provide flatter cornering. However, there are several draw backs associated with these mechanical systems. First, there are often packaging constraints associated with mechanical systems because a stabilizer bar/anti-roll bar requires a relatively straight, unobstructed path across the vehicle between the right and left dampers. Second, stabilizer bars/anti-roll bars are reactive and therefore only work when the suspension starts moving (i.e. leaning). Such mechanical systems do not limit body roll the moment a turn is initiated. Accordingly, there remains a need for improved vehicle suspension systems that can augment or replace traditional mechanical stabilizer bars/anti-roll bars.

SUMMARY

This section provides a general summary of the disclosure, and is not a comprehensive disclosure of its full scope or all of its features.

In accordance with one aspect of the subject disclosure, an active suspension system is provided. The active suspension system includes right and left dampers, a pump, and a control valve assembly. Each of the right and left dampers includes a damper housing, a piston rod, and a piston that is mounted on the piston rod. The piston is arranged in sliding engagement inside the damper housing such that the piston divides the damper housing into first and second working chambers. The pump includes a pump intake and a pump outlet. The control valve assembly is connected in fluid communication with the first and second working chambers of the right damper, the first and second working chambers of the left damper, the pump intake, and the pump outlet. The control valve assembly has several different arrangements of fluid flow paths that provide different working modes for the active suspension system.

The control valve assembly includes a first arrangement of fluid flow paths where the pump outlet is connected in fluid communication with the first working chambers of the right and left dampers. In the first arrangement of fluid flow paths through the control valve assembly, the pump outlet is fluidly isolated from the second working chambers of the right and left dampers. In accordance with the first arrangement of fluid flow paths through the control valve assembly, the pump operates to increase the fluid pressure in only the first working chambers of the right and left dampers.

The control valve assembly includes a second arrangement of fluid flow paths where the pump outlet is connected in fluid communication with the second working chambers of the right and left dampers. In the second arrangement of fluid flow paths through the control valve assembly, the pump outlet is fluidly isolated from the first working chambers of the right and left dampers. In accordance with the second arrangement of fluid flow paths through the control valve assembly, the pump operates to increase the fluid pressure in only the second working chambers of the right and left dampers.

The control valve assembly includes a third arrangement of fluid flow paths where the pump outlet is connected in fluid communication with the first working chamber of the left damper and the second working chamber of the right damper. In the third arrangement of fluid flow paths through the control valve assembly, the pump outlet is fluidly isolated from the first working chamber of the right damper and the second working chamber of the left damper. In accordance with the third arrangement of fluid flow paths through the control valve assembly, the pump operates to increase the fluid pressure in only the first working chamber of the left damper and the second working chamber of the right damper.

The control valve assembly includes a fourth arrangement of fluid flow paths where the pump outlet is connected in fluid communication with the first working chamber of the right damper and the second working chamber of the left damper. In the fourth arrangement of the fluid flow paths through the control valve assembly, the pump outlet is fluidly isolated from the second working chamber of the right damper and the first working chamber of the left damper. In accordance with the fourth arrangement of fluid flow paths through the control valve assembly, the pump operates to increase the fluid pressure in only the first working chamber of the right damper and the second working chamber of the left damper.

In accordance with another aspect of the present disclosure, the active suspension system includes a plurality of hydraulic lines connecting the pump and the right and left dampers to the control valve assembly. The plurality of hydraulic lines includes a first hydraulic line that extends between and fluidly connects the first working chamber of the right damper and the control valve assembly. The plurality of hydraulic lines includes a second hydraulic line that extends between and fluidly connects the second working chamber of the right damper and the control valve assembly. The plurality of hydraulic lines includes a third hydraulic line that extends between and fluidly connects the first working chamber of the left damper and the control valve assembly. The plurality of hydraulic lines includes a fourth hydraulic line that extends between and fluidly connects the second working chamber of the left damper to the control valve assembly. The plurality of hydraulic lines includes fifth and sixth hydraulic lines that extend between and fluidly connect the pump and the control valve assembly. The pump may be a bi-directional pump, where the pump intake and the pump outlet switch depending on the direction the pump is running in. Accordingly, either one of the fifth and sixth hydraulic lines can operate as a pump intake line and either one of the fifth and sixth hydraulic lines can operate as a pump discharge line.

The control valve assembly provides a first working mode where the pump discharge line is connected in fluid communication with the first and third hydraulic lines. In the first working mode, the pump increases fluid pressure in the first working chambers of the right and left dampers. The pump discharge line is fluidly isolated from the second and fourth hydraulic lines in the first working mode so the pump does not increase the fluid pressure in the second working chambers of the right and left dampers. The control valve assembly also provides a second working mode where the pump discharge line is connected in fluid communication with the second and fourth hydraulic lines. In the second working mode, the pump increases fluid pressure in the second working chambers of the right and left dampers. The pump discharge line is fluidly isolated from the first and third hydraulic lines in the second working mode so the pump does not increase the fluid pressure in the first working chambers of the right and left dampers. The control valve assembly also provides a third working mode where the pump discharge line is connected in fluid communication with the second and third hydraulic lines. In the third working mode, the pump increases fluid pressure in the second working chamber of the right damper and the first working chamber of the left damper. The pump discharge line is fluidly isolated from the first and fourth hydraulic lines in the third working mode so the pump does not increase the fluid pressure in the first working chamber of the right damper and the second working chamber of the left damper. The control valve assembly also provides a fourth working mode where the pump discharge line is connected in fluid communication with the first and fourth hydraulic lines. In the fourth working mode, the pump increases fluid pressure in the first working chamber of the right damper and the second working chamber of the left damper in the fourth working mode. The pump discharge line is fluidly isolated from the second and third hydraulic lines in the fourth working mode so the pump does not increase the fluid pressure in the second working chamber of the right damper and the first working chamber of the left damper.

In accordance with another aspect of the present disclosure, the active suspension system further includes a hydraulic reservoir that is fluidly connected to the control valve assembly by a seventh hydraulic line. The control valve assembly includes a valve block with multiple valve block segments that present different combinations of fluid flow paths through the control valve assembly (such as those described above). These different fluid flow paths through the control valve assembly provide the different working modes of the active suspension system. Each valve block segment includes a connection for each of the first, second, third, fourth, fifth, sixth, and seventh hydraulic lines.

Advantageously, the control valve assembly provides an active suspension system with a variety of different capabilities not previously available in a single system that uses a single pump. The active suspension system is able to reduce/eliminate the vehicle roll angle while cornering and can even achieve negative roll angle where the vehicle leans into corners for improved handling. The reduction of the roll angle improves the comfort, steering feel, agility, and stability of the vehicle. The roll control is provided by the roll stiffness (based on static pressure in the system) and the anti-roll active torque (generated by the pump). This translates into a reduced overall vehicle roll stiffness compared to a vehicle with a conventional anti-roll bar. Therefore, the comfort is improved. Comfort is also improved because the active forces are independent of the damping forces. Since part of the roll control is provided by the static pressure in the system, the overall power consumption of the system is reduced and provides a fail-safe because the system can rely on passive roll stiffness in case of a failure of the active component (pump/motor/inverter). Further handling improvements can be achieved by adapting the active roll torque between front/rear axles depending on driving conditions (e.g., limiting understeer behavior during acceleration in a curve). Anti-roll torque can also be applied to reduce the body oscillations resulting in improved comfort.

The control valve assembly can connect the pump outlet to either the first working chambers of the right and left dampers or the second working chambers of the right and left dampers to increase the fluid pressure in those respective chambers of the dampers. The control valve assembly can also connect the pump outlet to either the first working chambers of the right and left dampers or the second working chambers of the right and left dampers to decrease the fluid pressure in those respective chambers. As a result, the pump of the active stabilizer bar system can be used to modify the static pressure in the working chambers of the dampers and therefore the passive roll stiffness of the system. The control valve assembly can be used to reduce the ride height of (i.e., lower) the vehicle by connecting the pump outlet to the first working chambers of the right and left dampers and the pump intake to the second working chambers of the right and left dampers. The control valve assembly can also be used to increase the ride height of (i.e., lift/raise) the vehicle by connecting the pump outlet to the second working chambers of the right and left dampers and the pump intake to the first working chambers of the right and left dampers. Finally, the control valve assembly provides anti-roll control and therefore can augment or replace mechanical stabilizer bars/anti-roll bars, by connecting the pump outlet to either a combination of the first working chamber of the left damper and the second working chamber of the right damper or a combination of the first working chamber of the right damper and the second working chamber of the left damper. When this occurs, both the static pressure in the system and the dynamic pressure produced by the pump is used to counteract the rolling motion of the vehicle during cornering. Because the pump boosts the pressure in either the combination of the first working chamber of the left damper and the second working chamber of the right damper or the combination of the first working chamber of the right damper and the second working chamber of the left damper, the control valve assembly can control the suspension system such that the vehicle will lean into a corner for improved ride and handling performance.

BRIEF DESCRIPTION OF THE DRAWINGS

Other advantages will be readily appreciated, as the same becomes better understood by reference to the following detailed description when considered in connection with the accompanying drawings wherein.

DETAILED DESCRIPTION

Figure 1:
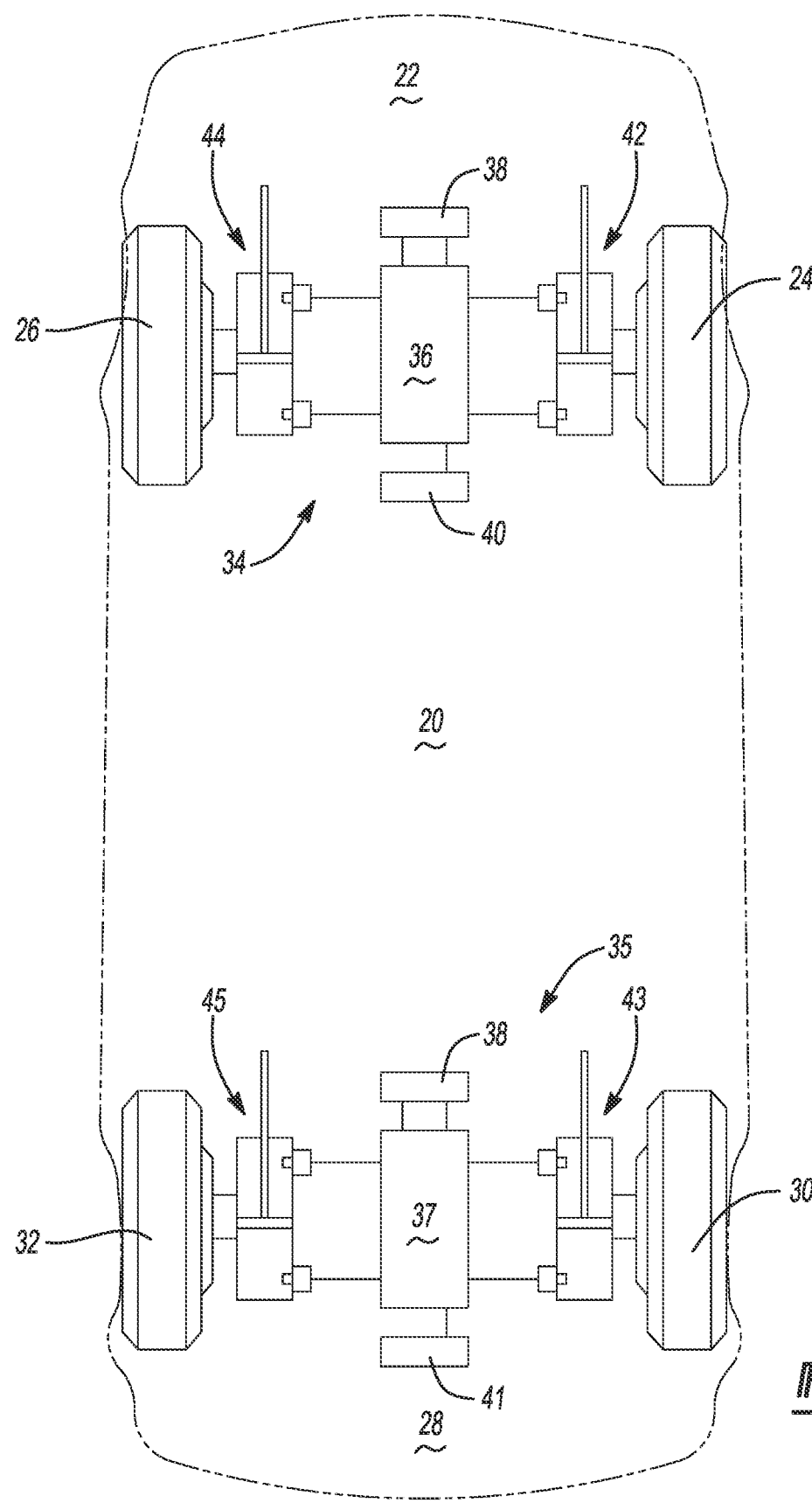
FIG. 1 is a schematic diagram illustrating a vehicle equipped with two exemplary active suspension systems that are constructed in accordance with the present disclosure.

Referring to the Figures, wherein like numerals indicate corresponding parts throughout the several views, an active suspension system 34, 35 is disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle 20 is illustrated with a front end 22 connected to a front right wheel 24 and a front left wheel 26, a rear end 28 connected to a back right wheel 30 and a back left wheel 32, a front active suspension system 34, and a rear active suspension system 35. The front active suspension system 34 is located at the front end 22 of the vehicle 20 and operates to control suspension movements and provide anti-roll control for the front wheels 24, 26 of the vehicle 20. The rear active suspension system 35 is located at the rear end 28 of the vehicle 20 and operates to control suspension movements and provide anti-roll control for the back wheels 30, 32 of the vehicle 20.

In FIG. 1, each of the active suspension systems 34, 35 includes a control valve assembly 36, 37 that is connected in fluid communication with a pump 38, 39 and a hydraulic reservoir 40, 41 (e.g., a tank). The control valve assembly 36 of the front active suspension system 34 is connected in fluid communication with a front right damper 42 and a front left damper 44. The control valve assembly 37 of the rear active suspension system 35 is connected in fluid communication with a back right damper 43 and a back left damper 45. The front right damper 42 controls (e.g., dampens) up and down (i.e., vertical) movements of the front right wheel 24 of the vehicle 20 and the front left damper 44 controls (e.g., dampens) up and down (i.e., vertical) movements of the front left wheel 26 of the vehicle 20. The back right damper 43 controls (e.g., dampens) up and down (i.e., vertical) movements of the back right wheel 30 of the vehicle 20 and the back left damper 45 controls (e.g., dampens) up and down (i.e., vertical) movements of the back left wheel 32 of the vehicle 20.

The anti-roll capabilities of the active suspension systems 34, 35 will be explained in greater detail below; however, from FIG. 1 it should be appreciated that the front active suspension system 34 can operate independently of the rear active suspension system 35 and that both active suspension systems 34, 35 can be used to either augment or completely replace mechanical stabilizer bars/anti-roll bars. Such mechanical systems require relatively straight, unobstructed runs between each of the front dampers and each of the back dampers. Accordingly, the active suspension systems 34, 35 disclosed herein offer packaging benefits because the front dampers 42, 44 only need to be hydraulically connected to the front control valve assembly 36 and the back dampers 43, 45 only needs to be hydraulically connected to the back control valve assembly 37.

In the illustrated embodiment, the front and rear active suspension systems 34, 35 are identical; however, other configurations are possible where the vehicle 20 includes only one of the active suspension systems 34, 35 or where the front active suspension system 34 is different from the rear active suspension system 35. The remainder of this application will discuss only the front active suspension system 34 with the understanding that the same may apply to the rear active suspension system 35.

Figure 2:
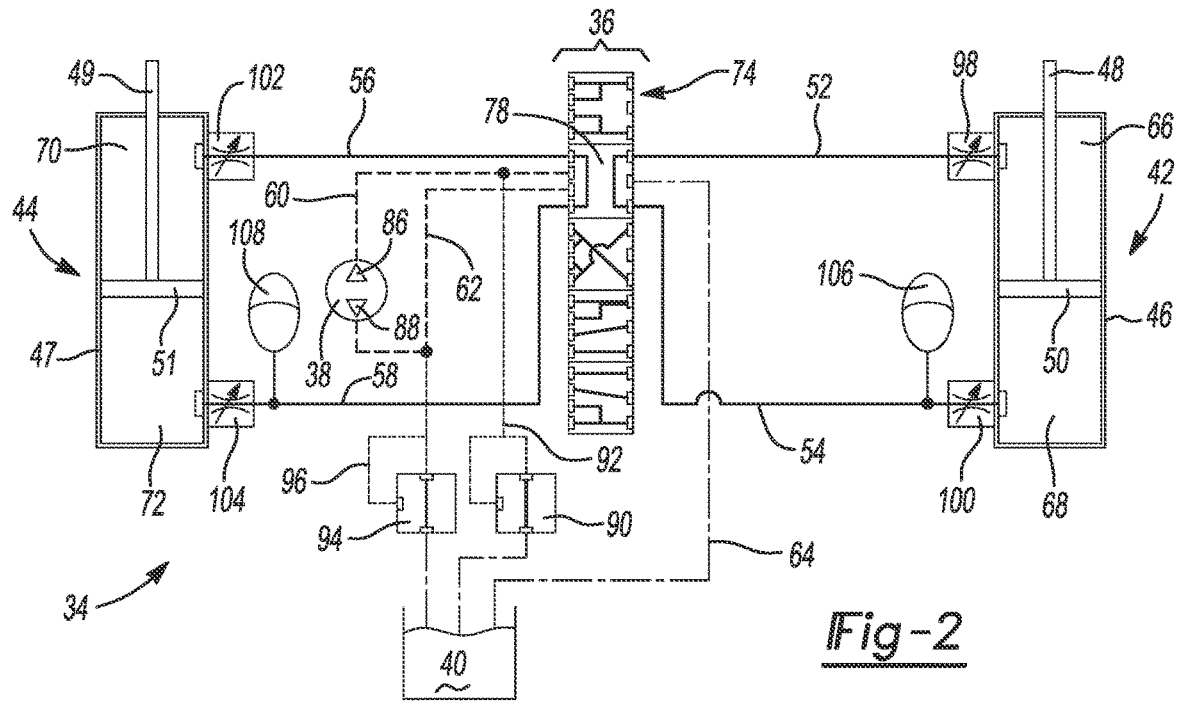
FIG. 2 is a schematic diagram illustrating one of the exemplary active suspension systems illustrated in FIG. 1, where the active suspension system is configured to provide a comfort working mode.

With reference to FIG. 2, each of the right and left dampers 42, 44 of the active suspension system 34 includes a damper housing 46, 47, a piston rod 48, 49, and a piston 50, 51 that is mounted on the piston rod 48, 49. The piston 50, 51 is arranged in sliding engagement with the inside of the damper housing 46, 47 such that the piston 50, 51 divides the damper housing 46, 47 into first and second working chambers 66, 68, 70, 72. The active suspension system 34 includes a plurality of hydraulic lines 52, 54, 56, 58, 60, 62, 64 connecting the pump 38, the hydraulic reservoir 40, and the right and left dampers 42, 44 to the control valve assembly 36. Although other configurations are possible, in the illustrated embodiment the pistons 50, 51 in the dampers 42, 44 are closed pistons with no fluid flow paths defined within or by their structure.

The plurality of hydraulic lines 52, 54, 56, 58, 60, 62, 64 includes a first hydraulic line 52 that extends between and fluidly connects to the first working chamber 66 of the right damper 42 and the control valve assembly 36. The plurality of hydraulic lines 52, 54, 56, 58, 60, 62, 64 includes a second hydraulic line 54 that extends between and fluidly connects the second working chamber 68 of the right damper 42 and the control valve assembly 36. The plurality of hydraulic lines 52, 54, 56, 58, 60, 62, 64 includes a third hydraulic line 56 that extends between and fluidly connects the first working chamber 70 of the left damper 44 and the control valve assembly 36. The plurality of hydraulic lines 52, 54, 56, 58, 60, 62, 64 includes a fourth hydraulic line 58 that extends between and fluidly connects the second working chamber 72 of the left damper 44 to the control valve assembly 36. The plurality of hydraulic lines 52, 54, 56, 58, 60, 62, 64 includes a fifth hydraulic line 60 and a sixth hydraulic line 62 that extend between and fluidly connect the pump 38 to the control valve assembly 36. The plurality of hydraulic lines 52, 54, 56, 58, 60, 62, 64 also includes a seventh hydraulic line 64 (i.e., a reservoir line) that extends between and fluidly connects the hydraulic reservoir 40 and the control valve assembly 36. In the illustrated example, the hydraulic lines 52, 54, 56, 58, 60, 62, 64 are made of flexible tubing (e.g., hydraulic hoses), but other conduit structures and/or fluid passageways can be used.

Figure 7:
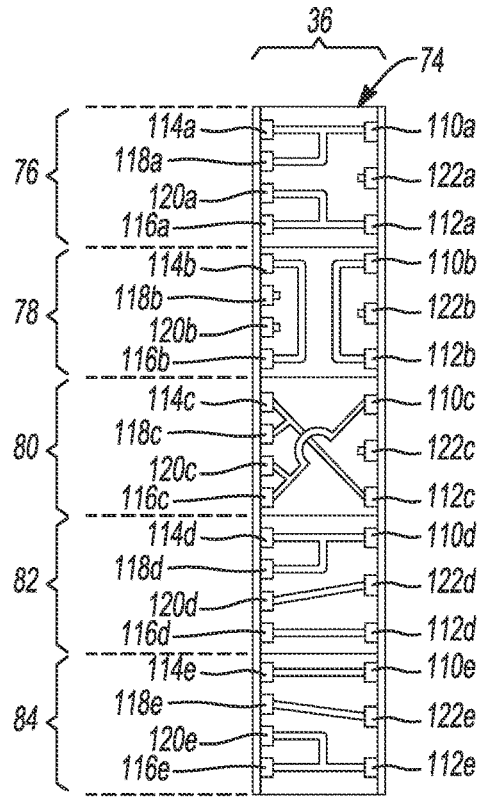
FIG. 7 is a schematic diagram illustrating an exemplary valve block of one of the exemplary active suspension systems illustrated in FIG. 1.
Figure 8:
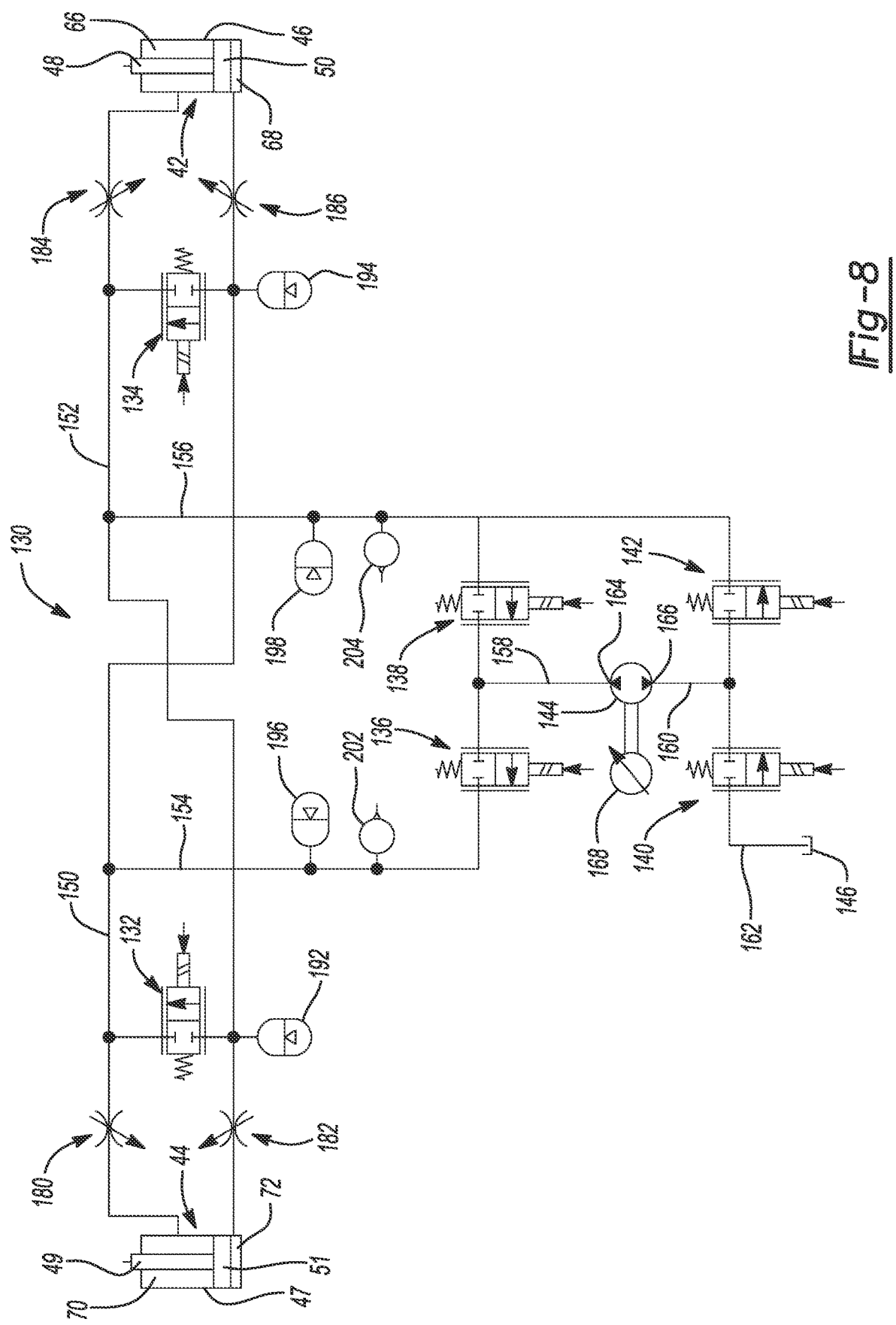
FIG. 8 is a schematic diagram illustrating an alternate active suspension system.

The control valve assembly 36 includes at least one valve block 74 with multiple valve block segments 76, 78, 80, 82, 84 (see FIG. 7). The different valve block segments 76, 78, 80, 82, 84 present different combinations of fluid flow paths through the control valve assembly 36, which define different working modes of the active suspension system 34. In the illustrated embodiment, a single valve block 74 is used with five valve block segments 76, 78, 80, 82, 84, but other configurations are possible.

Figure 3:
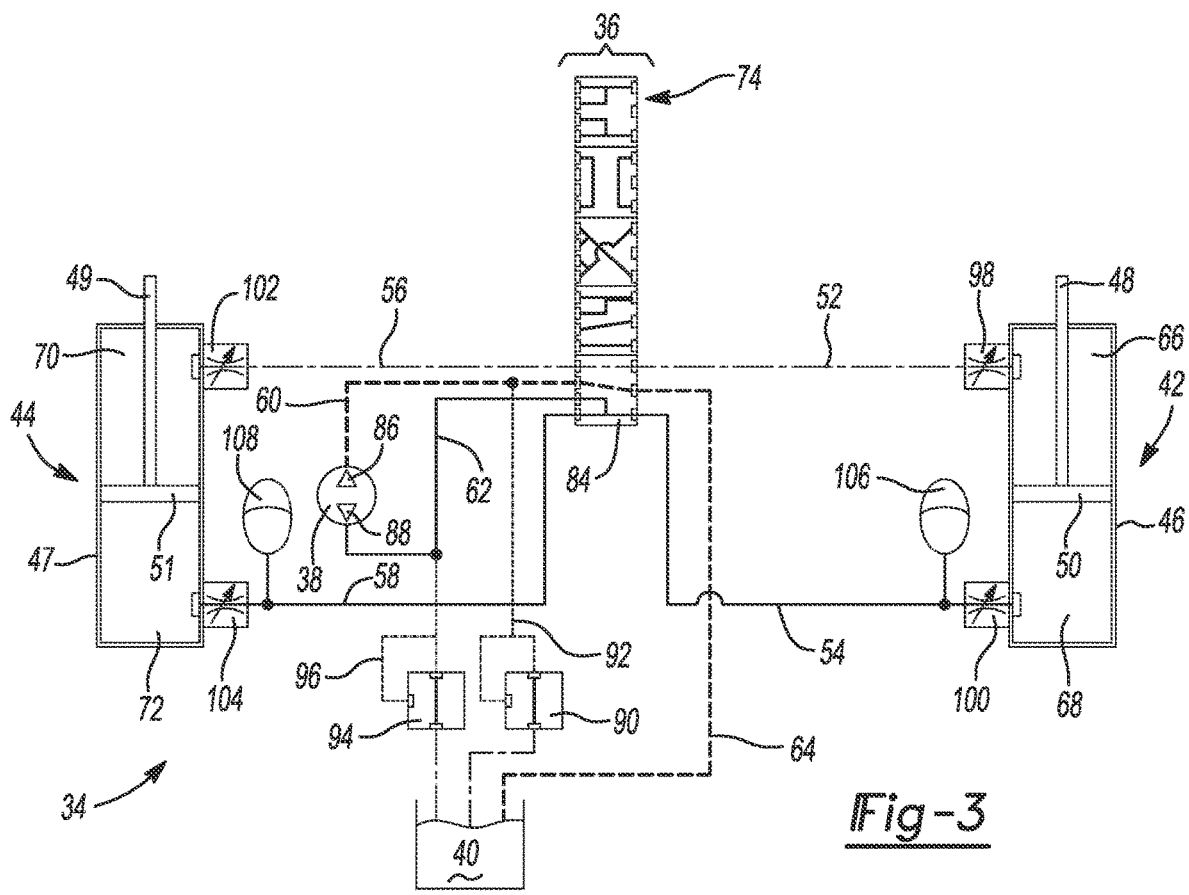
FIG. 3 is a schematic diagram illustrating one of the exemplary active suspension systems illustrated in FIG. 1, where the active suspension system is configured to provide a first pressure control working mode.
Figure 4:
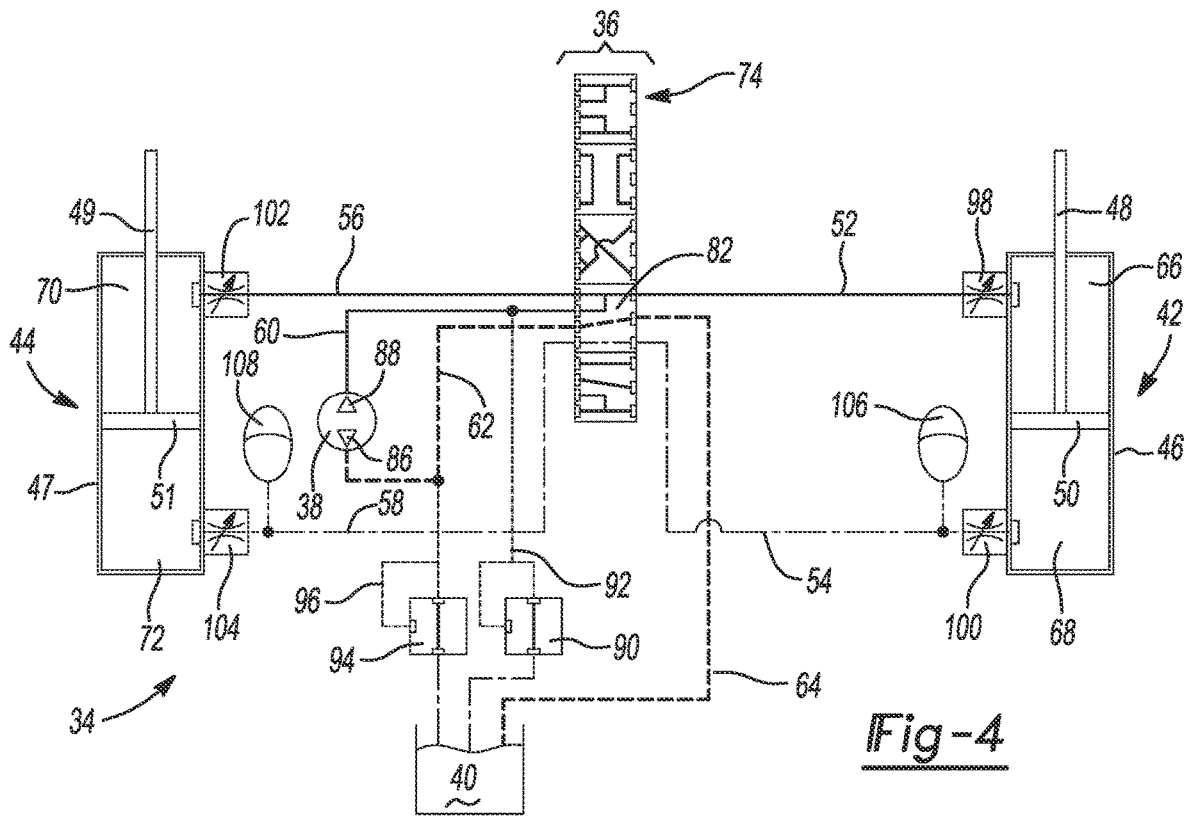
FIG. 4 is a schematic diagram illustrating one of the exemplary active suspension systems illustrated in FIG. 1, where the active suspension system is configured to provide a second pressure control working mode.
Figure 5:
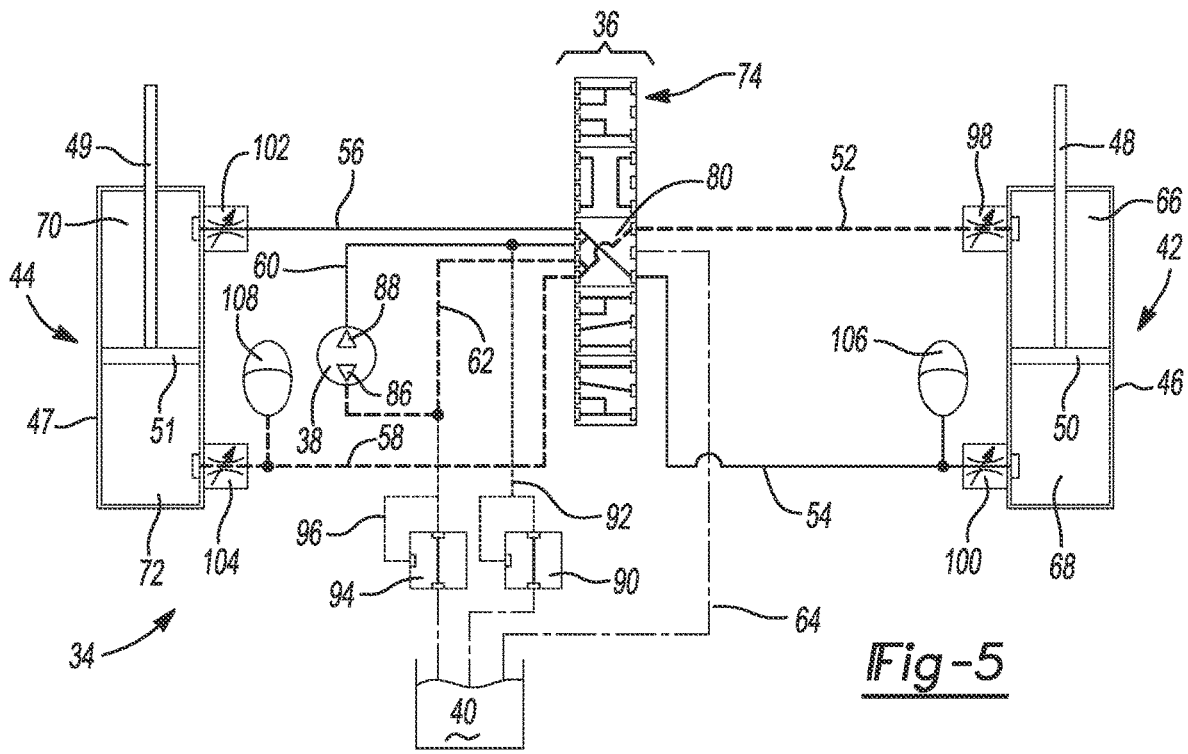
FIG. 5 is a schematic diagram illustrating one of the exemplary active suspension systems illustrated in FIG. 1, where the active suspension system is configured to provide a roll control working mode.
Figure 6:
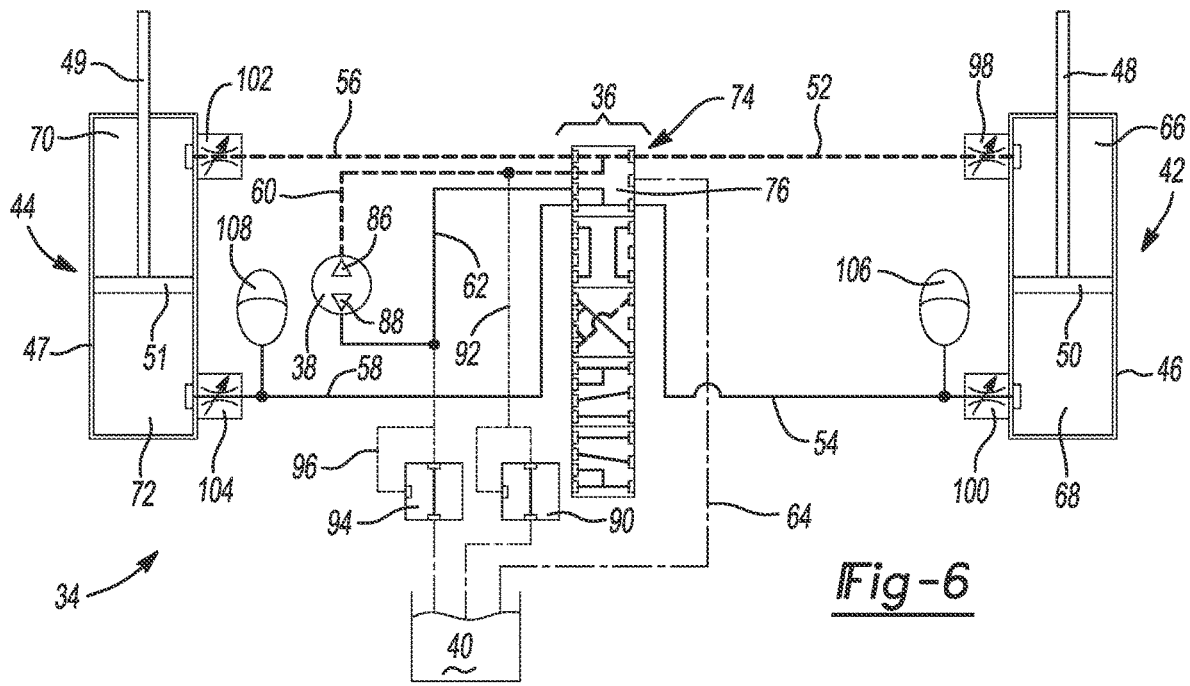
FIG. 6 is a schematic diagram illustrating one of the exemplary active suspension systems illustrated in FIG. 1, where the active suspension system is configured to provide a ride height control working mode.

The pump 38 includes a pump intake 86 and a pump outlet 88. The pump intake 86 is a port in the pump 38 that draws in hydraulic fluid. The pump outlet 88 is a port in the pump 38 that discharges hydraulic fluid at a fluid pressure that is greater than the fluid pressure at the pump intake 86. The pump 38 in the illustrated example is a bi-directional electric pump 38. As a result, the pump intake 86 and the pump outlet 88 switch depending on which direction the pump 38 is running in (i.e., depending on the polarity of the electricity that is supplied to the pump 38). Accordingly, either one of the fifth and sixth hydraulic lines 60, 62 can operate as a pump intake line and either one of the fifth and sixth hydraulic lines 60, 62 can operate as a pump discharge line. In the illustrated example, the fifth hydraulic line 60 operates as the pump discharge line and the sixth hydraulic line 62 operates as the pump intake line when the pump 38 runs in a forward direction (FIGS. 4 and 5). The fifth hydraulic line 60 operates as the pump intake line and the sixth hydraulic line 62 operates as the pump discharge line when the pump 38 runs in a reverse direction (FIGS. 3 and 6). When the vehicle is cornering, lateral acceleration is measured by one or more sensors (not shown) and the anti-roll torque to control the roll of the vehicle 20 is calculated by a controller (not shown) and used to control the pump 38. Alternatively, the lateral acceleration of the vehicle can be computed by the controller based on steering vehicle angle and vehicle speed. The dampers 42, 44 are used to provide forces that counteract the roll moment induced by the lateral acceleration, thus reducing the roll angle.

The fifth hydraulic line 60 is connected to a first pressure relief valve 90 by a first pressure relief line 92 and the sixth hydraulic line 62 is connected to a second pressure relief valve 94 by a second pressure relief line 96. In other words, both the pump intake line and the pump discharge line are connected in fluid communication with the two pressure relief valves 90, 94. Each of the pressure relief valves 90, 94 is configured to discharge hydraulic fluid (i.e., empty) into the hydraulic reservoir 40 when fluid pressure inside one of the fifth and sixth hydraulic lines 60, 62 exceeds a blow-off pressure. In the illustrated embodiment, the first and second pressure relief valves 90, 94 are constructed to have the same blow-off pressure. For example and without limitation, the blow-off pressure may be set to 120 bar. However, it should be appreciated that other configurations are possible where the blow-off pressure of the first pressure relief valve 90 is different from the blow-off pressure of the second pressure relief valve 94 or where one of the pressure relief valves 90, 94 is eliminated.

The active suspension system 34 also includes four electro-mechanical valves 98, 100, 102, 104, two for each damper 42, 44. A first electro-mechanical valve 98 is positioned between the first working chamber 66 of the right damper 42 and the first hydraulic line 52. A second electro-mechanical valve 100 is positioned between the second working chamber 68 of the right damper 42 and the second hydraulic line 54. A third electro-mechanical valve 102 is positioned between the first working chamber 70 of the left damper 44 and the third hydraulic line 56. A fourth electro-mechanical valve 104 is positioned between the second working chamber 72 of the left damper 44 and the fourth hydraulic line 58. The electro-mechanical valves 98, 100, 102, 104 are semi-active valves with a combination of passive spring-disk elements and a solenoid. The electro-mechanical valves 98, 100, 102, 104 provide variable compression and rebound damping for each of the right and left dampers 42, 44. For example, a controller (not shown) may be used to change an electrical current that is supplied to the solenoids of the electro-mechanical valves 98, 100, 102, 104 to change the damping characteristics of the right damper 42 and/or left damper 44 (e.g., to soften or firm up the ride).

The active suspension system 34 in the illustrated embodiment further includes a right accumulator 106 that is connected in fluid communication with the second hydraulic line 54 and a left accumulator 108 that is connected in fluid communication with the fourth hydraulic line 58. The right and left accumulators 106, 108 may be constructed in a number of different ways. For example and without limitation, the right and left accumulators 106, 108 may have accumulation chambers and pressurized gas chambers that are separated by floating pistons or flexible membranes.

With reference to FIG. 2, the active suspension system 34 is shown in a "comfort" working mode, where a second segment 78 of the valve block 74 is connected in fluid communication with the plurality of hydraulic lines 52, 54, 56, 58, 60, 62, 64. The second segment 78 of the valve block 74 includes an arrangement of fluid flow paths where the first hydraulic line 52 is connected in fluid communication with the second hydraulic line 54 and where the third hydraulic line 56 is connected in fluid communication with the fourth hydraulic line 58. This creates two separate hydraulic loops, one for each damper 42, 44.

In accordance with this arrangement of fluid flow paths, the first and second working chambers 66, 68 of the right damper 42 are connected in fluid communication with one another and are fluidly isolated from the pump 38 and the left damper 44. Therefore, hydraulic fluid can flow between the first and second working chambers 66, 68 of the right damper 42 via the hydraulic loop that includes the first and second hydraulic lines 52, 54. At the same time, the first and second working chambers 70, 72 of the left damper 44 are connected in fluid communication with one another and are fluidly isolated from the pump 38 and the right damper 42. Therefore, hydraulic fluid can flow between the first and second working chambers 70, 72 of the left damper 44 via the hydraulic loop that includes the third and fourth hydraulic lines 56, 58.

The two hydraulic loops are isolated from one another to fluidly isolate the right damper 42 from the left damper 44 such that the damping provided by the right damper 42 is independent of the damping provided by the left damper 44 and vice versa when the active suspension system 34 is operating in the "comfort" working mode. Additionally, the hydraulic loop that includes the first and second hydraulic lines 52, 54 and the hydraulic loop that includes the third and fourth hydraulic lines 56, 58 are fluidly isolated from the fifth, sixth, and seventh hydraulic lines 60, 62, 64 and therefore operate as closed loop systems. As a result, the "comfort" working mode is optimized for improving ride comfort and stability when the vehicle 20 is traveling in a straight path. In this working mode, the pump 38 is turned off. In effect, the active suspension system 34 works as a suspension system with no anti-roll bar in the "comfort" working mode. It should be noted that this mode may also be activated when the vehicle 20 is operating off-road, where maximum suspension articulation is useful.

When the right damper 42 undergoes a compression stroke in the "comfort" working mode, fluid in the second working chamber 68 of the right damper 42 flows through the second electro-mechanical valve 100 and into the second hydraulic line 54. The fluid passes through the valve block 74, into the first hydraulic line 52, through the first electro-mechanical valve 98, and into the first working chamber 66 of the right damper 42. When the right damper 42 undergoes an extension (i.e., rebound) stroke in the "comfort" working mode, fluid in the first working chamber 66 of the right damper 42 flows through the first electro-mechanical valve 98 and into the first hydraulic line 52. The fluid passes through the valve block 74, into the second hydraulic line 54, through the second electro-mechanical valve 100, and into the second working chamber 68 of the right damper 42. When the left damper 44 undergoes a compression stroke in the "comfort" working mode, fluid in the second working chamber 72 of the left damper 44 flows through the fourth electro-mechanical valve 104 and into the fourth hydraulic line 58. The fluid passes through the valve block 74, into the third hydraulic line 56, through the third electro-mechanical valve 102, and into the first working chamber 70 of the left damper 44. When the left damper 44 undergoes an extension (i.e., rebound) stroke in the "comfort" working mode, fluid in the first working chamber 70 of the left damper 44 flows through the third electro-mechanical valve 102 and into the third hydraulic line 56. The fluid passes through the valve block 74, into the fourth hydraulic line 58, through the fourth electro-mechanical valve 104, and into the second working chamber 72 of the left damper 44.

With reference to FIG. 3, the active suspension system 34 is shown in a "first pressure control" working mode, where a fifth segment 84 of the valve block 74 is connected in fluid communication with the plurality of hydraulic lines 52, 54, 56, 58, 60, 62, 64. The fifth segment 84 of the valve block 74 includes an arrangement of fluid flow paths where the sixth hydraulic line 62 is connected in fluid communication with the second and fourth hydraulic lines 54, 58. In this working mode, the pump 38 is running in a reverse direction such that the sixth hydraulic line 62 is acting as the pump discharge line and the fifth hydraulic line 60 is acting as the pump intake line. The pump 38 discharges hydraulic fluid into the sixth hydraulic line 62, which creates a high pressure segment comprised of the second, fourth, and sixth hydraulic lines 54, 58, 62. As a result, the pump outlet 88 is connected in fluid communication with the second working chambers 68, 72 of the right and left dampers 42, 44 through the high pressure segment such that the pump 38 increases the fluid pressure in the second working chambers 68, 72 of the right and left dampers 42, 44. By way of example and without limitation, the pump 38 may operate to raise the fluid pressure in the high pressure segment from 20 bar to 40 bar, which in turn will provide greater roll stiffness.

In accordance with the arrangement of fluid flow paths through the fifth segment 84 of the valve block 74, the fifth hydraulic line 60 is connected in fluid communication with seventh hydraulic line 64, which allows the pump intake 86 to draw hydraulic fluid from the hydraulic reservoir 40. The pump 38 therefore creates a low pressure segment comprised of the fifth and seventh hydraulic lines 60, 64, which is fluidly isolated from the high pressure segment. In the arrangement of fluid flow paths through the fifth segment 84 of the valve block 74, the first and third hydraulic lines 52, 56 are connected in fluid communication with one another, but fluidly isolated from the high pressure segment and the low pressure segment. As a result, the pump 38 is fluidly isolated from the first working chambers 66, 70 of the right and left dampers 42, 44 and does not change the fluid pressure in the first and third hydraulic lines 52, 56. It should be appreciated that when the pump 38 is run in the forward direction under this arrangement, the fifth hydraulic line 60 becomes the pump discharge line and the sixth hydraulic line 62 becomes the pump intake line. The pump 38 operates to reduce the fluid pressure in the second and fourth hydraulic lines 54, 58 and therefore the second working chambers 68, 72 of the right and left dampers 42, 44 by pumping hydraulic fluid from these components back into the hydraulic reservoir 40.

With reference to FIG. 4, the active suspension system 34 is shown in a "second pressure control" working mode, where a fourth segment 82 of the valve block 74 is connected in fluid communication with the plurality of hydraulic lines 52, 54, 56, 58, 60, 62, 64. The fourth segment of the valve block 74 includes an arrangement of fluid flow paths where the fifth hydraulic line 60 is connected in fluid communication with the first and third hydraulic lines 52, 56. In this working mode, the pump 38 is running in a forward direction such that the fifth hydraulic line 60 is acting as the pump discharge line and the sixth hydraulic line 62 is acting as the pump intake line. The pump 38 discharges hydraulic fluid into the fifth hydraulic line 60, which creates a high pressure segment comprised of the first, third, and fifth hydraulic lines 52, 56, 60. As a result, the pump outlet 88 is connected in fluid communication with the first working chambers 66, 70 of the right and left dampers 42, 44 through the high pressure segment such that the pump 38 increases the fluid pressure in the first working chambers 66, 70 of the right and left dampers 42, 44. By way of example and without limitation, the pump 38 may operate to raise the fluid pressure in the high pressure segment from 20 bar to 40 bar, which in turn will provide greater roll stiffness.

In accordance with the arrangement of fluid flow paths through the fourth segment 82 of the valve block 74, the sixth hydraulic line 62 is connected in fluid communication with seventh hydraulic line 64, which allows the pump intake 86 to draw hydraulic fluid from the hydraulic reservoir 40. The pump 38 therefore creates a low pressure segment comprised of the sixth and seventh hydraulic lines 62, 64, which is fluidly isolated from the high pressure segment. In the arrangement of fluid flow paths through the fourth segment 82 of the valve block 74, the second and fourth hydraulic lines 54, 58 are connected in fluid communication with one another, but fluidly isolated from the high pressure segment and the low pressure segment. As a result, the pump 38 is fluidly isolated from the second working chambers 68, 72 of the right and left dampers 42, 44 and does not change the fluid pressure in the second and fourth hydraulic lines 54, 58. It should be appreciated that when the pump 38 is run in the reverse direction under this arrangement, the sixth hydraulic line 62 becomes the pump discharge line and the fifth hydraulic line 60 becomes the pump intake line. The pump 38 operates to reduce the fluid pressure in the first and third hydraulic lines 52, 56 and therefore the first working chambers 66, 70 of the right and left dampers 42, 44 by pumping hydraulic fluid from these components back into the hydraulic reservoir 40. The basic/passive roll stiffness based on the static pressure in active suspension system 34 can be adjusted by setting the pressure when the system 34 is in the first and second pressure control working modes.

With reference to FIG. 5, the active suspension system 34 is shown in a "roll control" working mode, where a third segment 80 of the valve block 74 is connected in fluid communication with the plurality of hydraulic lines 52, 54, 56, 58, 60, 62, 64. The third segment 80 of the valve block 74 includes an arrangement of fluid flow paths where the second and third hydraulic lines 54, 56 are connected in fluid communication with one another and where the first and fourth hydraulic lines 52, 58 are connected in fluid communication with one another. The second and third hydraulic lines 54, 56 are connected in fluid communication with the fifth hydraulic line 60 through the arrangement of fluid flow paths in the third segment of valve block 74. The first and second hydraulic lines 52, 54 are connected in fluid communication with the sixth hydraulic line 62 through the arrangement of fluid flow paths in the third segment 80 of valve block 74. However, the second, third, and fifth hydraulic lines 54, 56, 60 are fluidly isolated from the first, fourth, and sixth hydraulic lines 52, 58, 62 and the seventh hydraulic line 64 is fluidly isolated from all of the other hydraulic lines 52, 54, 56, 58, 60, 62.

The arrangement of fluid flow paths through the third segment 80 of the valve block 74 provides anti-roll functionality using the static pressure in active suspension system 34. For example, when the vehicle 20 is turning left, lateral forces cause the right side of the vehicle 20 to squat or lean, which compresses the right damper 42 and extends the left damper 44. When this occurs, the fluid volume in the first working chamber 70 of the left damper 44 decreases, which sends hydraulic fluid into the third hydraulic line 56, through the third segment 80 of the valve block 74, through the second hydraulic line 54 and into the second working chamber 68 of the right damper 42. This increases the pressure in the second working chamber 68 of the right damper 42, which acts the firm up the right damper 42, counteract the roll moment of the vehicle 20, and correct the roll angle. The opposite occurs when the vehicle 20 is turning right. Because this anti-roll functionality operates using the static pressure in the system, a fail-safe is provided where the system still operates to reduce vehicle body roll even when the pump 38 is not operational.

In the "roll control" working mode, the active suspension system 34 combines the static pressure anti-roll functionality with the dynamic pressure provided by the pump 38. In other words, the pump 38 is used to increase (i.e., boost) the pressure in the second and third hydraulic lines 54, 56 even further when the vehicle 20 is leaning right (i.e., when the vehicle 20 is turning left) and in the first and fourth hydraulic lines 52, 58 when the vehicle 20 is leaning left (i.e., when the vehicle 20 is turning right). FIG. 5 illustrates the first scenario (i.e., where the vehicle 20 is turning left). The pump 38 is running in the forward direction such that the fifth hydraulic line 60 is operating as the pump discharge line and the sixth hydraulic line 62 is operating as the pump intake line. As a result, the pump outlet 88 is connected in fluid communication with the first working chamber 70 of the left damper 44 and the second working chamber 68 of the right damper 42 and creates a high pressure segment comprised of the second, third, and fifth hydraulic lines 54, 56, 60. At the same time, the pump intake 86 is connected in fluid communication with the first working chamber 66 of the right damper 42 and the second working chamber 72 of the left damper 44 and creates a low pressure segment comprised of the first, fourth, and sixth hydraulic lines 52, 58, 62. Together, this creates high pressures in the first working chamber 70 of the left damper 44 and in the second working chamber 68 of the right damper 42 and low pressures in the first working chamber 66 of the right damper 42 and the second working chamber 72 of the left damper 44. These pressure differentials oppose the roll moment of the vehicle 20 and correct the roll angle. The dynamic pressure provided by the pump 38 can take this a step further and increase the pressure differential to the point where the vehicle 20 can lean into a turn (e.g., lean left when the vehicle 20 is turning left) for improved handling performance.

In the second scenario (i.e., where the vehicle 20 is turning right), the polarity of the electric current supplied to the pump 38 is reversed such that the pump 38 runs in a reverse direction. When this occurs, the fifth hydraulic line 60 is operating as the pump intake line and the sixth hydraulic line 62 is operating as the pump discharge line. As a result, the pump outlet 88 is connected in fluid communication with the first working chamber 66 of the right damper 42 and the second working chamber 72 of the left damper 44 and creates a high pressure segment comprised of the first, fourth, and sixth hydraulic lines 52, 58, 62. At the same time, the pump intake 86 is connected in fluid communication with the first working chamber 70 of the left damper 44 and the second working chamber 68 of the right damper 42 and creates a low pressure segment comprised of the second, third, and fifth hydraulic lines 54, 56, 60. Together, this creates high pressures in the first working chamber 66 of the right damper 42 and in the second working chamber 72 of the left damper 44 and low pressures in the first working chamber 70 of the left damper 44 and the second working chamber 68 of the right damper 42. These pressure differentials oppose the roll moment of the vehicle 20 and correct the roll angle. Again, the dynamic pressure provided by the pump 38 can take this a step further and increase the pressure differential to the point where the vehicle 20 can lean into a turn (e.g., lean right when the vehicle 20 is turning right) for improved handling performance.

With reference to FIG. 6, the active suspension system 34 is shown in a "ride height control" working mode, where a first segment 76 of the valve block 74 is connected in fluid communication with the plurality of hydraulic lines 52, 54, 56, 58, 60, 62, 64. The first segment 76 of the valve block 74 includes an arrangement of fluid flow paths. The fifth hydraulic line 60 is connected in fluid communication with the first and third hydraulic lines 52, 56 and where the sixth hydraulic line 62 is connected in fluid communication with the second and fourth hydraulic lines 54, 58. In accordance with this arrangement, the first, third, and fifth hydraulic lines 52, 56, 60 are fluidly isolated from the second, fourth, and sixth hydraulic lines 54, 58, 62 and the seventh hydraulic line 64 is fluidly isolated from all of the other hydraulic lines 52, 54, 56, 58, 60, 62. In FIG. 6, the pump 38 is illustrated running in a reverse direction such that the sixth hydraulic line 62 is acting as the pump discharge line and the fifth hydraulic line 60 is acting as the pump intake line. The pump 38 discharges hydraulic fluid into the sixth hydraulic line 62, which creates a high pressure segment comprised of the second, fourth, and sixth hydraulic lines 54, 58, 62. As a result, the pump outlet 88 is connected in fluid communication with the second working chambers 68, 72 of the right and left dampers 42, 44 through the high pressure segment and can increase the fluid pressure in the second working chambers 68, 72 of the right and left dampers 42, 44. The pump 38 draws hydraulic fluid from the fifth hydraulic line 60, which creates a low pressure segment comprised of the first, third, and fifth hydraulic lines 52, 56, 60. As a result, the pump intake 86 is connected in fluid communication with the first working chambers 66, 70 of the right and left dampers 42, 44 through the low pressure segment and can decrease the fluid pressure in the first working chambers 66, 70 of the right and left dampers 42, 44. Together, the pressure differential between the first and second working chambers 66, 68, 70, 72 in the right and left dampers 42, 44 operate to lift (i.e., raise) the vehicle 20, increasing the ride height. This can be used to provide improved ground clearance during off-road operation or to give low riding vehicles improved ground clearance when traversing speed bumps.

The active suspension system 34 can also operate where the pump 38 is run in the forward direction such that the fifth hydraulic line 60 is acting as the pump discharge line and the sixth hydraulic line 62 is acting as the pump intake line. Under this arrangement, the pump 38 discharges hydraulic fluid into the fifth hydraulic line 60, which creates a high pressure segment comprised of the first, third, and fifth hydraulic lines 52, 56, 60. As a result, the pump outlet 88 is connected in fluid communication with the first working chambers 66, 70 of the right and left dampers 42, 44 through the high pressure segment and can increase the fluid pressure in the first working chambers 66, 70 of the right and left dampers 42, 44. The pump 38 draws hydraulic fluid from the sixth hydraulic line 62, which creates a low pressure segment comprised of the second, fourth, and sixth hydraulic lines 54, 58, 62. As a result, the pump intake 86 is connected in fluid communication with the second working chambers 68, 72 of the right and left dampers 42, 44 through the low pressure segment and can decrease the fluid pressure in the second working chambers 68, 72 of the right and left dampers 42, 44. Together, the pressure differential between the first and second working chambers 66, 68, 70, 72 in the right and left dampers 42, 44 operate to lower the vehicle 20, decreasing the ride height. This can be used to improve corning performance or to provide easier passenger ingress and egress for high riding vehicles.

With reference to FIG. 7, each valve block segment 76, 78, 80, 82, 84 in the valve block 74 includes seven connections 110a-e, 112a-e, 114a-e, 116a-e, 118a-e, 120a-e, 122a-e, one for each of the first, second, third, fourth, fifth, sixth, and seventh hydraulic lines 52, 54, 56, 58, 60, 62, 64. Although other configurations are possible, four connections 114a-e, 116a-e, 118a-e, 120a-e may be provided on one side of each valve block segment 76, 78, 80, 82, 84 and three connections 110a-e, 112a-e, 122a-e may be provided on the opposite side of each valve block segment 76, 78, 80, 82, 84. The control valve assembly 36 controls which working mode is selected by operably connecting the hydraulic lines 52, 54, 56, 58, 60, 62, 64 with the connections 110a-e, 112a-e, 114a-e, 116a-e, 118a-e, 120a-e, 122a-e of one of the valve block segments 76, 78, 80, 82, 84 and not the others. In other words, the control valve assembly 36 switches which valve block segment 76, 78, 80, 82, 84 is connected in fluid communication with the hydraulic lines 52, 54, 56, 58, 60, 62, 64. In the illustrated example, the connections 110a-e, 112a-e, 114a-e, 116a-e, 118a-e, 120a-e, 122a-e are illustrated as parts, but other connection structures may be used.

The first valve block segment 76 includes a first connection 110a that is configured to be connected to the first hydraulic line 52, a second connection 112a that is configured to be connected to the second hydraulic line 54, a third connection 114a that is configured to be connected to the third hydraulic line 56, a fourth connection 116a that is configured to be connected to the fourth hydraulic line 58, a fifth connection 118a that is configured to be connected to the fifth hydraulic line 60, a sixth connection 120a that is configured to be connected to the sixth hydraulic line 62, and a seventh connection 122a that is configured to be connected to the seventh hydraulic line 64. The first valve block segment 76 includes an arrangement of fluid flow paths where the first, third, and fifth connections 110a, 114a, 118a are interconnected and where the second, fourth, and sixth connections 112a, 116a, 120a are interconnected. The seventh connection 122a is closed and is therefore fluidly isolated.

The second valve block segment 78 includes a first connection 110b that is configured to be connected to the first hydraulic line 52, a second connection 112b that is configured to be connected to the second hydraulic line 54, a third connection 114b that is configured to be connected to the third hydraulic line 56, a fourth connection 116b that is configured to be connected to the fourth hydraulic line 58, a fifth connection 118b that is configured to be connected to the fifth hydraulic line 60, a sixth connection 120b that is configured to be connected to the sixth hydraulic line 62, and a seventh connection 122b that is configured to be connected to the seventh hydraulic line 64. The second valve block segment 78 includes an arrangement of fluid flow paths where the first and second connections 110b, 112b are interconnected and where the third and fourth connections 114b, 116b are interconnected. The fifth, sixth, and seventh connections 118b, 120b, 122b are closed and are therefore fluidly isolated.

The third valve block segment 80 includes a first connection 110c that is configured to be connected to the first hydraulic line 52, a second connection 112c that is configured to be connected to the second hydraulic line 54, a third connection 114c that is configured to be connected to the third hydraulic line 56, a fourth connection 116c that is configured to be connected to the fourth hydraulic line 58, a fifth connection 118c that is configured to be connected to the fifth hydraulic line 60, a sixth connection 120c that is configured to be connected to the sixth hydraulic line 62, and a seventh connection 122c that is configured to be connected to the seventh hydraulic line 64. The third valve block segment 80 includes an arrangement of fluid flow paths where the second, third, and fifth connections 112c, 114c, 118c are interconnected and where the first, fourth, and sixth connections 110c, 116c, 120c are interconnected. The seventh connection 122c is closed and therefore is fluidly isolated.

The fourth valve block segment 82 includes a first connection 110d that is configured to be connected to the first hydraulic line 52, a second connection 112d that is configured to be connected to the second hydraulic line 54, a third connection 114d that is configured to be connected to the third hydraulic line 56, a fourth connection 116d that is configured to be connected to the fourth hydraulic line 58, a fifth connection 118d that is configured to be connected to the fifth hydraulic line 60, a sixth connection 120d that is configured to be connected to the sixth hydraulic line 62, and a seventh connection 122d that is configured to be connected to the seventh hydraulic line 64. The fourth valve block segment 82 includes an arrangement of fluid flow paths where the first, third, and fifth connections 110d, 114d, 118d are interconnected, where the sixth and seventh connections 120d, 122d are interconnected, and where the second and fourth connections 112d, 116d are interconnected.

The fifth valve block segment 84 includes a first connection 110e that is configured to be connected to the first hydraulic line 52, a second connection 112e that is configured to be connected to the second hydraulic line 54, a third connection 114e that is configured to be connected to the third hydraulic line 56, a fourth connection 116e that is configured to be connected to the fourth hydraulic line 58, a fifth connection 118e that is configured to be connected to the fifth hydraulic line 60, a sixth connection 120e that is configured to be connected to the sixth hydraulic line 62, and a seventh connection 122e that is configured to be connected to the seventh hydraulic line 64. The fifth valve block segment 84 includes an arrangement of fluid flow paths where the second, fourth, and sixth connections 112e, 116e, 120e are interconnected, where the first and third connections 110e, 114e are interconnected, and where the fifth and seventh connections 118e, 122e are interconnected.

FIGS. 8-13 depict an alternate active suspension system 130 located at the front end 22 of the vehicle 20 to operate and control suspension movements and provide anti-roll control for the front wheels 24, 26 of the vehicle 20. It should be appreciated that active suspension system 130 may also be configured to control the rear wheels of the vehicle 20, if desired. Active suspension system 130 may include the same or similar front right and left dampers 42, 44 as previously described. While active suspension system 130 may function substantially the same or similarly to active suspension systems 34, 35, the components interconnecting the right and left dampers 42, 44 differ from those previously described.

Active suspension system 130 includes a control valve system comprising a first control valve 132, a second control valve 134, a third control valve 136, a fourth control valve 138, a fifth control valve 140, and a sixth control valve 142 in fluid communication with a pump 144 and a hydraulic fluid reservoir 146. A plurality of hydraulic lines 150, 152, 154, 156, 158, 160, and 162 hydraulically connect control valves 132, 134, 136, 138, 140, 142 to right and left dampers 42, 44, pump 144 and hydraulic fluid reservoir 146.

Hydraulic line 150 extends between and fluidly interconnects first working chamber 70 of left damper 44 to second chamber 68 of right damper 42. Hydraulic line 152 extends between and fluidly interconnects first working chamber 66 of right damper 42 with second working chamber 72 of left damper 44. Hydraulic line 154 extends between and fluidly interconnects hydraulic line 150 with third control valve 136. Hydraulic lines 156 extends between and fluidly interconnects hydraulic line 152 with fourth control valve 138. Hydraulic line 156 also interconnects hydraulic line 152 with sixth control valve 142. Hydraulic line 158 interconnects third control valve 136, fourth control valve 138 and a first port 164 of pump 144. Hydraulic line 160 interconnects fifth control valve 140, sixth control valve 142, and a second port 166 pump 144.

First control valve 132 is positioned between and selectively fluidly interconnects hydraulic line 150 with hydraulic line 152. Second control valve 134 is positioned between and selectively fluidly interconnects hydraulic line 152 with hydraulic line 150. Hydraulic line 162 fluidly interconnects reservoir 146 with fifth control valve 140. It should be appreciated that the hydraulic lines 150, 152, 154, 156, 158, 160, and 162 may be constructed from rigid line, flexible tubing, hoses or the like.

Each of control valves is substantially similar to the other with each being a two position, spring biased, solenoid operated valve. Each valve is spring biased to a closed position. When electrically energized, the solenoid urges an internal component within the valve, such as a translatable spool, to move to an open position. Fluid may not pass through the control valve when in the closed position. Fluid is allowed to freely pass through the control valve when in the open position. Valve structures other than spools may also be used, including but not limited to poppets. Although control valves are described as solenoid operated, they may be operated by other electrical structures or using energy other than electrical energy.

Pump 144 includes a first pump port 166 and a second pump port 164. It should be appreciated that since pump 144 is a bi-directional pump, the pump port that acts as an intake on pump 144 and the pump port and that acts as an outlet may be switched when the rotational direction of a motor 168 driving pump 144 is reversed. For example, when motor 168 is driving in a first direction and fifth control valve 140 is open, fluid is drawn from hydraulic fluid reservoir 146 through hydraulic line 160 to pump port 166. Pump port 166 acts as a pump intake during this portion of operation. Pressurized fluid exits pump port 164 acting as a pump outlet. In a different operational mode, described hereinafter, motor 168 drives in a second, opposite direction to draw fluid from hydraulic line 158 into port 164 which now acts as a pump intake. Pressurized fluid exits pump port 166, acting as the pump outlet.

Active suspension system 130 also includes a first flow control valve 180, a second flow control valve 182, a third flow control valve 184, and a fourth flow control valve 186. First flow control valve interconnects in his fluidly and is in fluid communication with the first working chamber 70 and hydraulic line 150. Second flow control valve is positioned between and in fluid communication with second working chamber 72 and hydraulic line 152. Third flow control valve 184 is positioned between and in fluid communication with first working chamber 66 and hydraulic line 152. Fourth flow control valve 186 is positioned between and in fluid communication with second working chamber 68 and hydraulic line 150. The flow control valves may be configured as hydraulic passive valves or semi-active hydraulic valves. As such, the flow control valves need not be in receipt of an electrical signal if configured as passive valves.

Active suspension system 130 may also include a first accumulator 192, a second accumulator 194, a third accumulator 186, and a fourth accumulator 198. First accumulator 192 is in fluid communication with line 152. Second accumulator 194 is in fluid communication with hydraulic line 150. Third accumulator 196 is in fluid communication with hydraulic line 154. A fourth accumulator 198 is in fluid communication with hydraulic line 156. A first pressure sensor 202 is operable to output a signal indicative of the pressure within hydraulic line 154. A second pressure sensor 204 is operable to output a signal indicative of the pressure within hydraulic line 156.

It should be appreciated that active suspension system 130 may be operated in four different working modes. A passive roll control mode is available to reduce vehicle roll angle while cornering. By reducing the roll angle of the vehicle, the driver and passengers may experience increased comfort, steering feel, as well as other positive experiences including increased vehicle ability and stability. Passive roll control is provided by charging active suspension system 130 with a predetermined fluid pressure and mechanically capturing the pressurized fluid in communication with the dampers 42, 44.

A pressure control mode is useful for charging the system with pressurized fluid as well as providing temperature compensation. The pressure control mode may be entered to perform a vehicle lift or vehicle lowering operation.

An active roll control mode is also available. An anti-roll torque may be applied by active suspension system 130 when pump 144 is energized to output pressurized fluid to one of hydraulic line 150 and hydraulic line 152. Active suspension system 130 may impart a negative roll angle if desired. An anti-roll torque may be applied to reduce body oscillations thereby resulting in an improved ride experience. Overall vehicle roll stiffness is increased when compared to a conventional vehicle equipped with a passive mechanical stabilizer bar.

Active suspension system 130 is configured to operate in a third or comfort mode. In the comfort mode of operation, the control valve assemblies of the control valve system are opened to minimize resistance to fluid flow therethrough as well as between right damper 42 and left damper 44. A detailed description of each operation mode follows.

Table 1 provides a state diagram as a quick overview of valve and pump motor operating states usable to achieve the desired operating mode of active suspension system 130 identified as Configuration 1. Table 1 presents a shorthand nomenclature for the control valves and the position of the control valves. C1 represents first control valve 132. C2 identifies second control valve 134. C3 pertains to third control valve 136. C4 identifies fourth control valve 138. C5 corresponds to fifth control valve 140 and C6 identifies and sixth control valve 142. Reference numeral 1 indicates that the valve is in the open position allowing fluid to pass therethrough. Reference numeral 0 indicates that the valve is de-energized and closed. In certain modes of operation, Table 1 indicates that the "pump is locked". Any number of mechanical locking systems may be employed to restrict rotation of electric motor 168 or the internal components of pump 144 to prevent fluid from passing through pump 144. Alternatively, an electrical brake may be applied to electric motor 168 to restrict it and pump 144 from rotating. Conversely, entries within Table 1 stating that the pump is free running indicate that internal components of pump 144 are allowed to move and allow fluid to pass through pump 144.

hydraulic line 152 interconnecting first working chamber 66 of right damper 42 with second working chamber 72 of left damper 44. As the vehicle turns the right, the center of gravity of vehicle 20 imparts a load on left damper 44 attempting to drive piston 51 downwardly in the figure. Simultaneously, piston 50 of right damper 42 is urged upwardly in the figure. Pressure increases in hydraulic line 152 to resist movement of each piston 50, 51 in the noted directions. Passive roll control is achieved.

First accumulator 192 and second accumulator 194 are positioned within hydraulic lines 152, 150 respectively to minimize the magnitude of any spikes in the pressure wave that may occur during vehicle operation. The accumulators are optional but may improve ride quality by allowing each of the dampers to act somewhat independently from each other while concurrently providing passive roll control.

Figure 10:
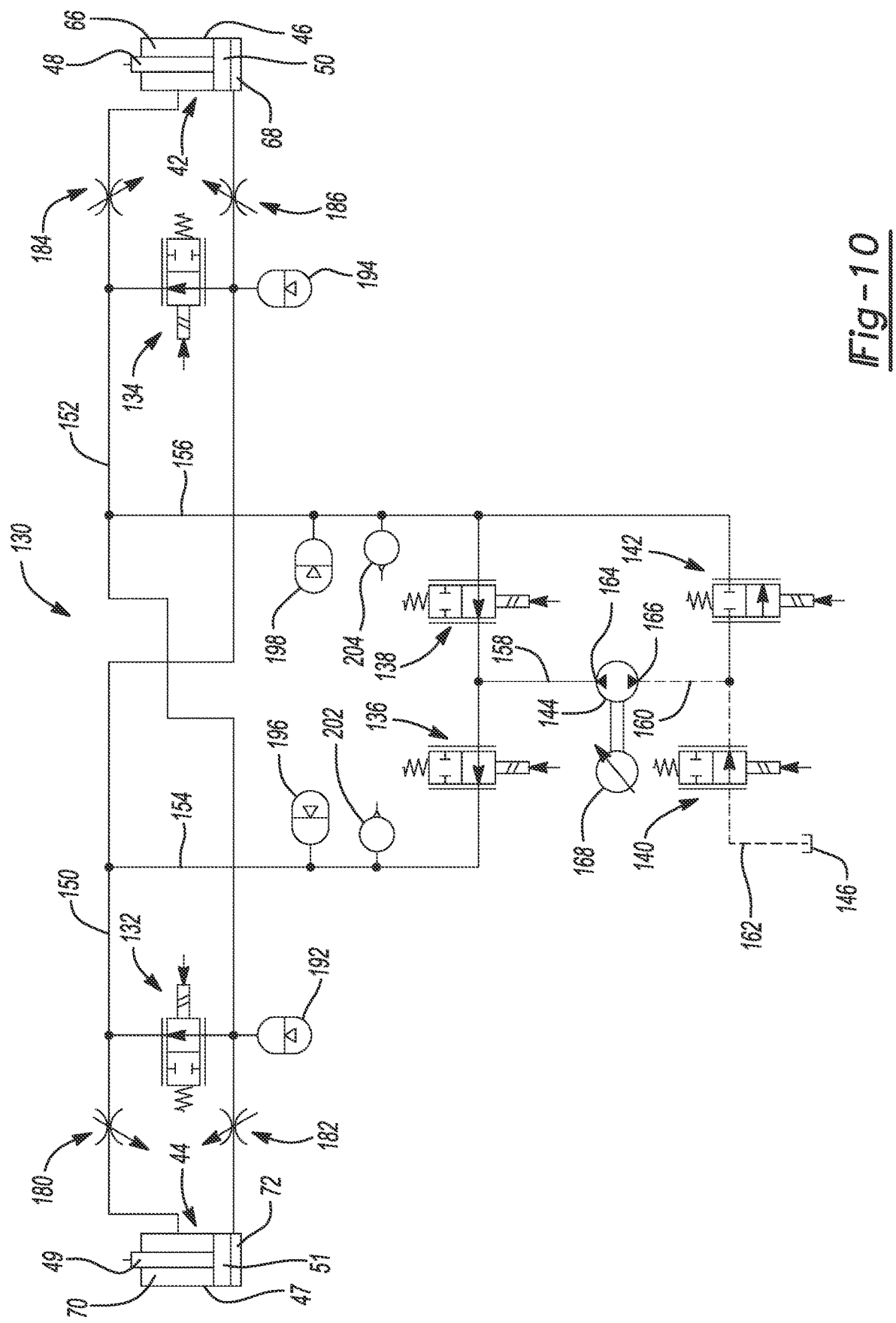
FIG. 10 is a schematic diagram illustrating the exemplary active suspension system illustrated in FIG. 8, where the active suspension system is configured to provide a pressure control working mode.

FIG. 10 illustrates a pressure control mode in which the static pressure within active suspension system 130 may be set. First accumulator 192 and second accumulator 194 may be charged with a predetermined pressure by setting the control valves as shown in this figure. In particular, first control valve 132, second control valve 134, third control

TABLE 1

| Mode/Component status | Configuration 1 | | |
|---|---|---|---|
| Roll control (Active) | Method 1:<br>C1 = 0<br>C2 = 0<br>C3 = 1<br>C4 = 0<br>C5 = 0<br>C6 = 1<br>Pump is enabled | | |
| Roll control (Passive) | Method 1:<br>C1 = 0<br>C2 = 0<br>C3 = 0<br>C4 = 0<br>C5 = 0<br>C6 = 0<br>Pump is disabled | Method 2:<br>C1 = 0<br>C2 = 0<br>C3 = 1<br>C4 = 0<br>C5 = 0<br>C6 = 1<br>Pump is locked | |
| Comfort mode | Method 1:<br>C1 = 1<br>C2 = 1<br>C3 = 0<br>C4 = 0<br>C5 = 0<br>C6 = 0<br>Pump is disabled | Method 2:<br>C1 = 1<br>C2 = 1<br>C3 = 1<br>C4 = 1<br>C5 = 0<br>C6 = 0<br>Pump is disabled | Method 3:<br>C1 = 1<br>C2 = 1<br>C3 = 1<br>C4 = 0<br>C5 = 0<br>C6 = 1<br>Pump is free running |
| Pressure control mode | Method 1:<br>C1 = 1<br>C2 = 1<br>C3 = 1<br>C4 = 1<br>C5 = 1<br>C6 = 0<br>Pump is enabled | Method 2:<br>C1 = 0<br>C2 = 0<br>C3 = 1<br>C4 = 1<br>C5 = 1<br>C6 = 0<br>Pump is enabled | |

Figure 9:
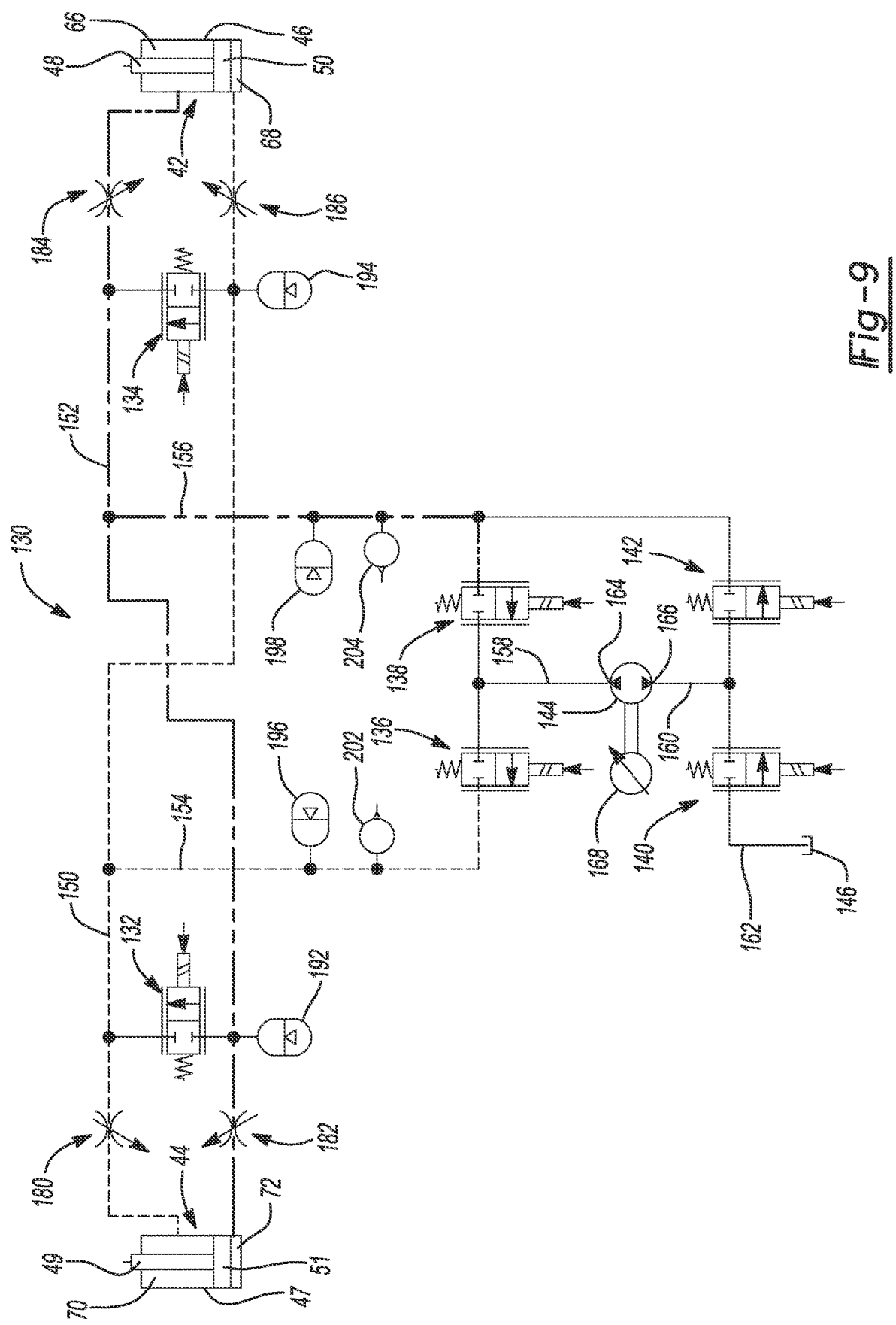
FIG. 9 is a schematic diagram illustrating the exemplary active suspension system illustrated in FIG. 8, where the active suspension system is configured to provide a passive roll control working mode.

FIG. 9 depicts active suspension system 130 operating in the passive roll control mode during a right hand turn. The forward direction of vehicle travel is the top of the page. Motor 168 is de-energized and pump 144 does not provide additional pressurized fluid to the system at this time. Each of first control valve 132, second control valve 134, third control valve 136, fourth control valve 138, fifth control valve 140, and sixth control valve 142 are de-energized and in the normally closed position. With the control valves in the previously mentioned positions, hydraulic line 150 defines a first circuit interconnecting first working chamber 70 of left damper 44 with second working chamber 68 of right damper 42. A second separate circuit is defined by valve 136, fourth control valve 138, and fifth control valve 140 are energized and set to the open position. If it is desirable to increase the pressure within the system, motor 168 drives in a direction drawing fluid from hydraulic fluid reservoir 146 with pump port 166 functioning as the pump inlet. Pump port 164 functions as the pump outlet. Pressurized fluid is supplied to both hydraulic line 150 and hydraulic line 152. To reduce the pressure within active suspension system 130, the same valves are energized to the open position but motor 168 is driven in an opposite direction to pump fluid from hydraulic line 150 and hydraulic line 152 into hydraulic fluid reservoir 146. When reducing the static pressure in the system, pump port 164 functions as the pump inlet while pump port 166 functions as the pump outlet. Once the desired charge pressure has been set, the control valves may be returned to the passive roll control configuration previously described or any other configuration noted below.

The pressure control mode depicted in FIG. 10 may also be useful in other situations than simply setting the charge pressure of active suspension system 130. For example, it may be desirable to compensate for ambient temperature change in which active suspension system 130 operates. If a temperature rise imparts an increased pressure to hydraulic line 150, hydraulic line 152 or both, pump 144 may be driven to reduce the pressure in either or both hydraulic lines 150, 152. If a temperature decrease undesirably decreases pressure within the system, pump 144 may be driven to add pressure in either or both hydraulic lines 150, 152.

Another alternate function may be provided relating to vehicle ride height. The vehicle may be lifted or dropped relative to the ground based on the magnitude of pressure present within active suspension system 130. Control of the control valves and pump 144 may be executed as previously described in relation to increasing or decreasing the static pressure within active suspension system 130

Figure 11:
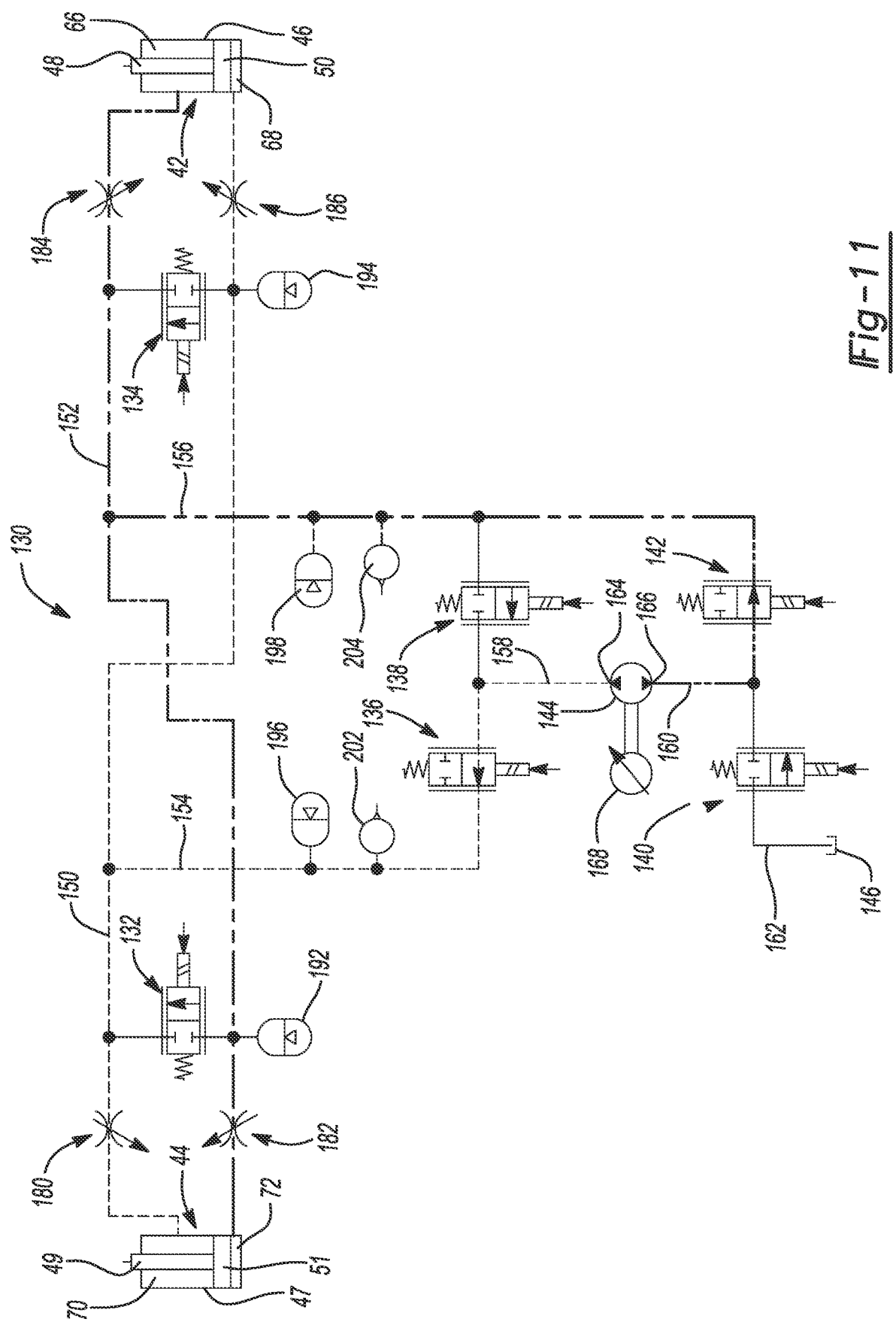
FIG. 11 is a schematic diagram illustrating the exemplary active suspension system illustrated in FIG. 8, where the active suspension system is configured to provide an active roll control working mode.

The operating mode of active suspension system 130 may be switched from the passive roll control mode to the active roll control mode by energizing one of third control valve 136 and fourth control valve 138 as well as sixth control valve 142 to place these valves in the open position. The remaining control valves maintain their closed positions. FIG. 11 depicts an instance when it is desirable to pressurize the first working chamber 66 of right damper 42 as well as the second working chamber 72 of left damper 44. This version of control may be desirable during a right-hand vehicle turn and is achieved by energizing third control valve 136 and sixth control valve 142 while energizing motor 168 to drive pump 144 such that port 164 acts as the pump intake and port 166 functions as the pump outlet. Hydraulic line 152 is in receipt of high pressure. Hydraulic line 150 experiences a lower fluid pressure. It should be noted that fifth control valve 140 remains in the closed position such that hydraulic fluid from reservoir 146 is not drawn into pump 144. Fluid supply for pump 144 is provided by hydraulic line 150.

Similarly, but not depicted in FIG. 11, active roll control may include energizing fourth control valve 138 and sixth control valve 142. Third control valve 136 remains in the closed position. In this instance, hydraulic line 150 receives pressurized fluid from port 164 of pump 144. Upper working chamber 70 of left damper 44 and lower working chamber 68 of right damper 42 are highly pressurized while hydraulic line 152, upper working chamber 66 of right damper 42 and lower working chamber 72 of left damper 44 experience a lower fluid pressure. This type of active roll control may be desired when the vehicle is experiencing a left-hand turn.

Figure 12:
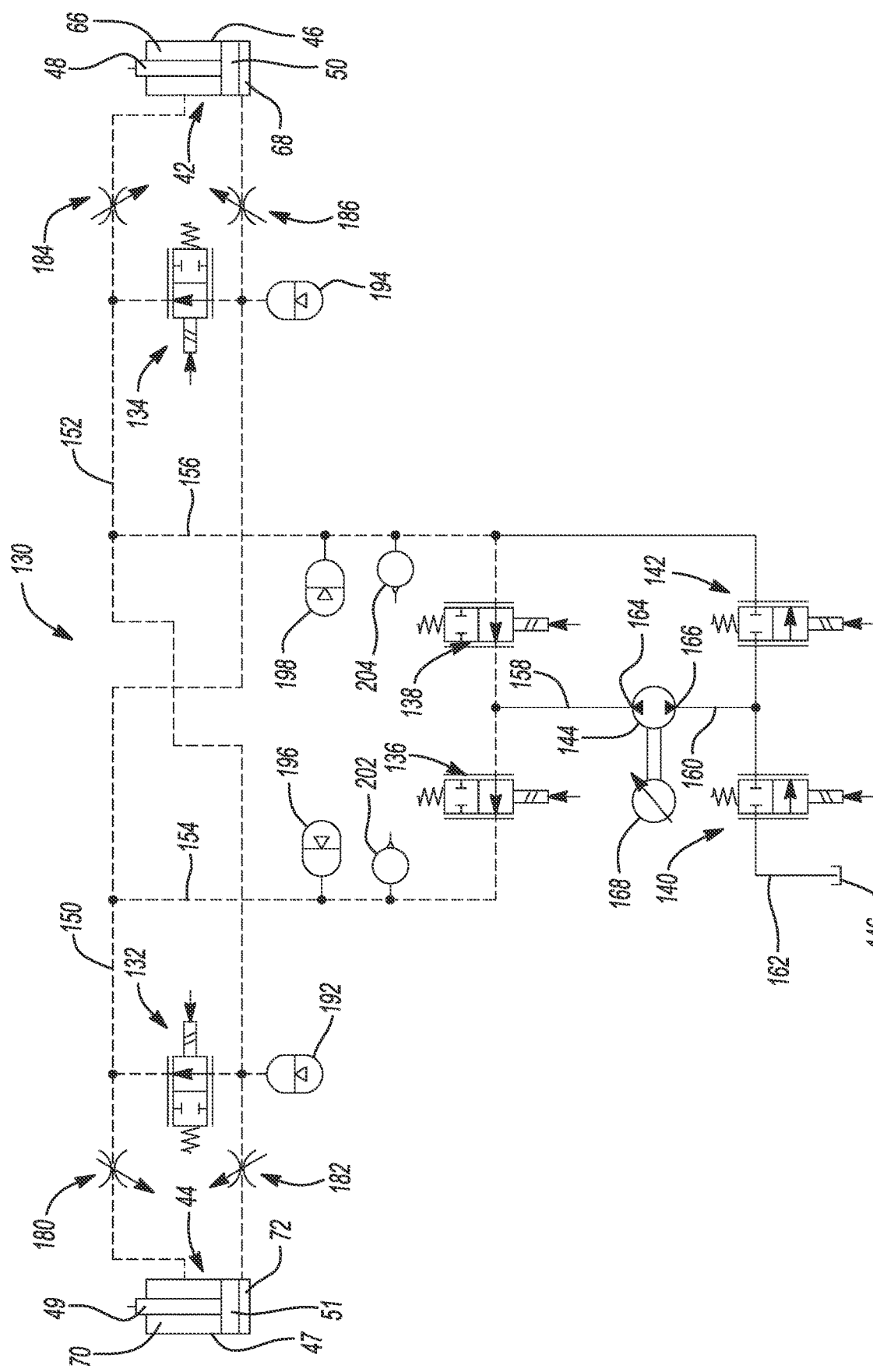
FIG. 12 is a schematic diagram illustrating the exemplary active suspension system illustrated in FIG. 8, where the active suspension system is configured to provide a comfort working mode.

FIG. 12 represents one method of operating active suspension system 130 in the comfort mode. First control valve 132 and second control valve 134 are moved to the open position to interconnect hydraulic line 150 and hydraulic line 152 at two separate locations. First control valve 132 may be positioned proximate to left damper 44 to minimize the distance traveled there between. Similarly, second control valve 134 may be positioned proximate right damper 42 to minimize the length of conduit between right damper 42 and second control valve 134. To further reduce restriction of fluid within active suspension system 130, third control valve 136 and fourth control valve 138 are energized to the open position. In this manner, active suspension system 130 imparts a minimal resistance to translation of piston rod 48 within right damper 42 and piston rod 49 within left damper 44. Ride behavior is defined by the basic operating characteristics of right damper 42, left damper 44 and any mechanical (spring or rod) configurations of the suspension.

Figure 13:
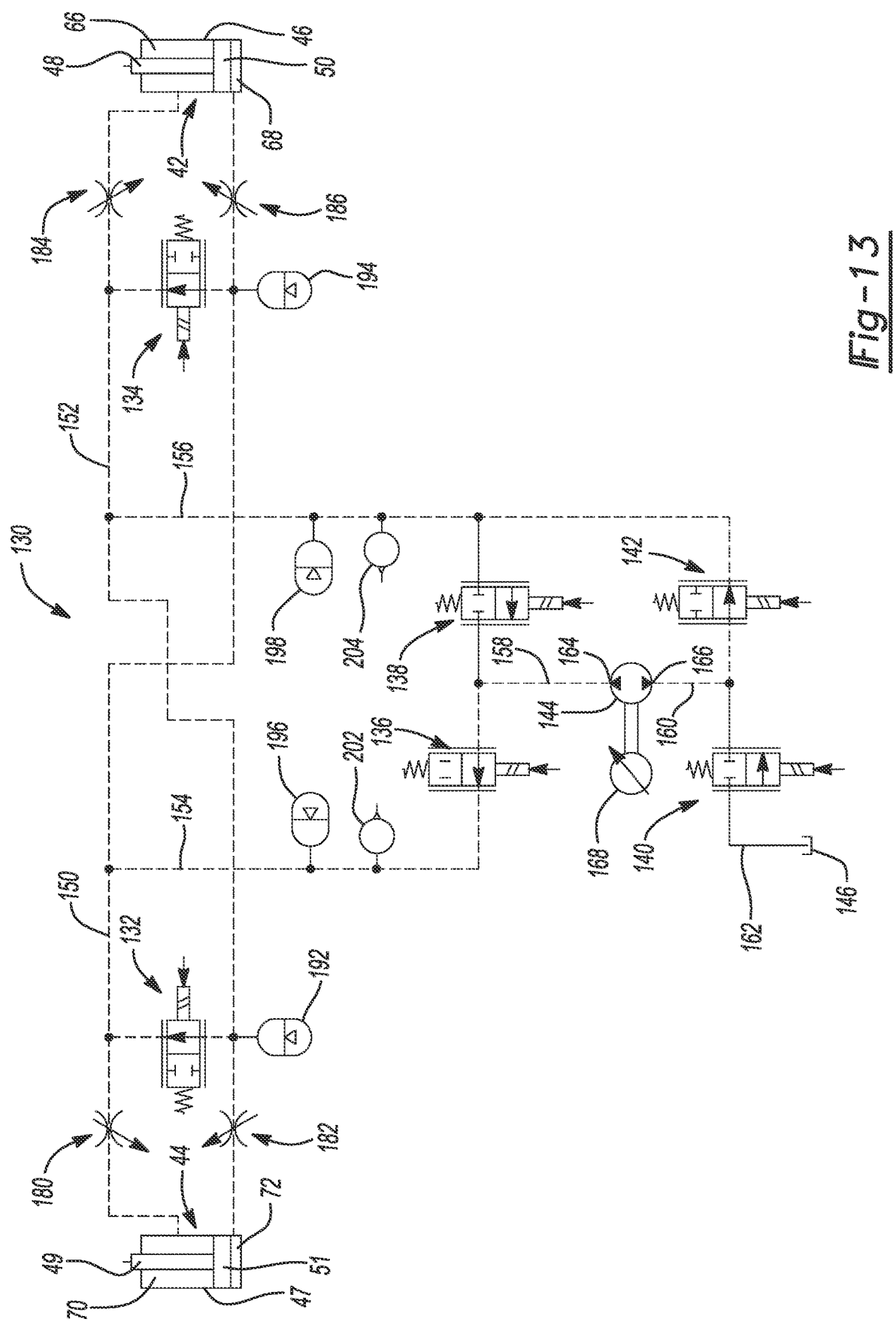
FIG. 13 is a schematic diagram illustrating the exemplary active suspension system illustrated in FIG. 8, where the active suspension system is configured to provide an alternate comfort working mode.

FIG. 13 depicts an alternate way to place active suspension system 130 in the comfort mode of operation. As before, first control valve 132 and second control valve 134 energized to the open position to interconnect hydraulic line 150 and hydraulic line 152 at two separate locations. Third control valve 136 and sixth control valve 142 are energized to place these valves in the open position and allow fluid to pass through pump 144. It may be desirable to allow fluid to pass through pump 144 while the pump is de-energized. Inertia characteristics of the internal components of the pump will serve to slightly restrict flow and provide a slightly modified comfort mode. To further tailor the comfort mode from a wide open pass-through system to a more restricted flow configuration, electric motor 168 may be energized at a duty cycle less than 100%. The pump may be energized in a direction to restrict flow therethrough. A tailored amount of resistance to fluid flow may be provided to tune the comfort mode of operation to a particular vehicle or an operator's target.

Figure 14:
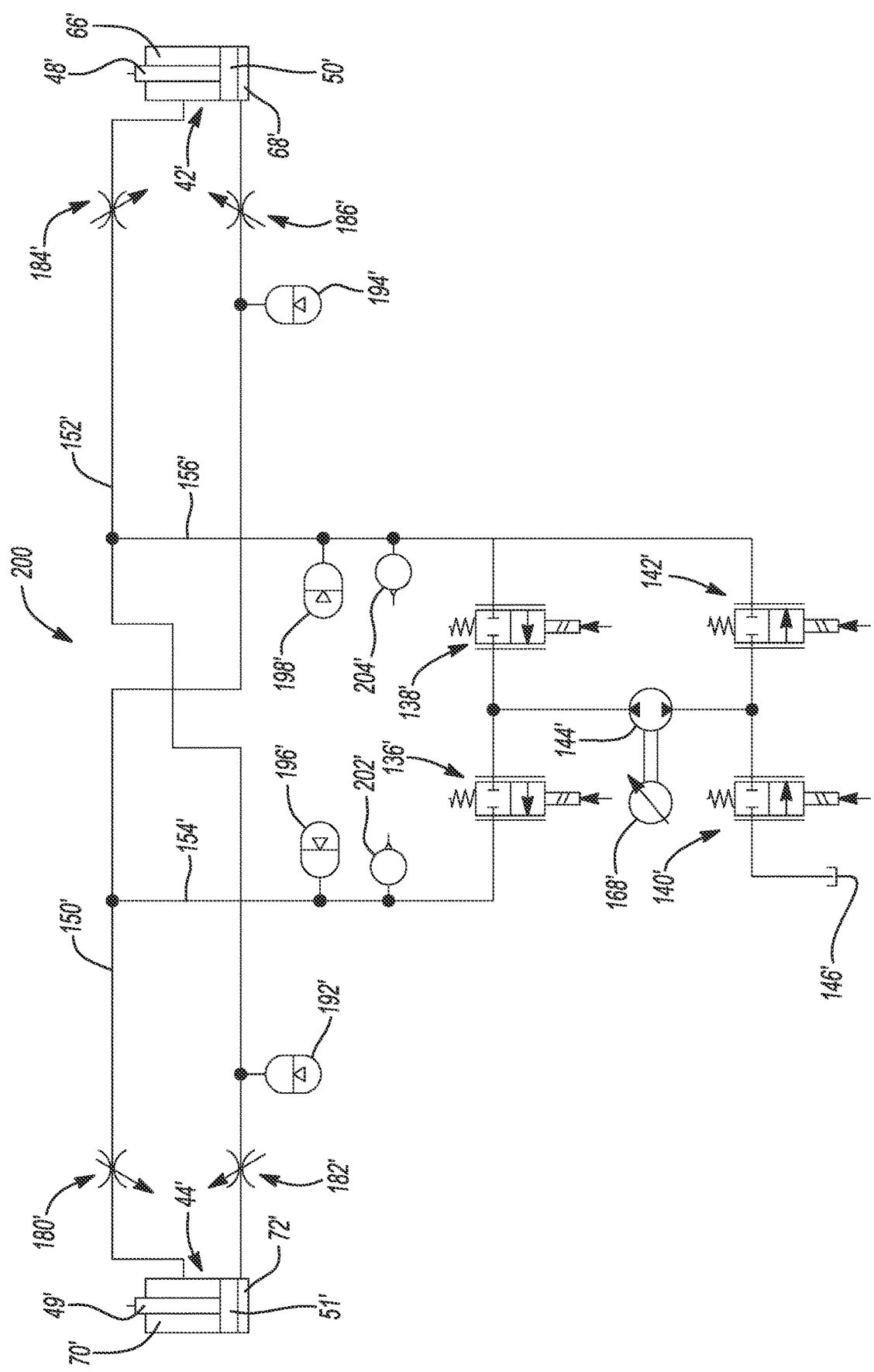
FIG. 14 is a schematic diagram illustrating another alternate active suspension system.

FIG. 14 depicts an alternate configuration active suspension system identified with reference 200. Active suspension system 200 is a simplified system including four two-position directional control valves instead of the six control valve system previously described. Substantially the same functions previously described may be provided by active suspension system 200 at reduced cost and complexity. Active suspension system 200 is substantially the same as active suspension system 130 with the exception that first control valve 132 and second control valve 134 have been removed. For clarity, like elements will retain their previously introduced reference numerals including a prime suffix.

Active suspension system 200 may be placed in the passive roll control mode according to a first method by allowing each of third control valve 136', fourth control valve 138', fifth control valve 140', and sixth control valve 142' in the de-energized, closed position. Pump 144' is de-energized. An alternate, second method of providing passive roll control is achieved by energizing third control valve 136' and sixth control valve 142'. When utilizing the second method for passive roll control, pump 144' is locked such that fluid is not allowed to pass through pump 144'. Table 2 provides a state diagram indicating the state of each of the control valves of active suspension system 200 (Configuration 2) to provide a certain operation mode. Table 2 presents a shorthand representation of the control valves and the position of the control valves. C3 pertains to third control valve 136'. C4 identifies fourth control valve 138'. C5 corresponds to fifth control valve 140' and C6 identifies and sixth control valve 142'. Reference numeral 1 indicates that the valve is in the open position allowing fluid to pass therethrough. Reference numeral 0 indicates that the valve is de-energized and closed.

TABLE 2

| Mode/Component status | Configuration 2 |
|---|---|
| Roll control (Active) | Method 1:<br>C3 = 1 or C3 = 0<br>C4 = 0 or C4 = 1<br>C5 = 0<br>C6 = 1<br>Pump is enabled |

TABLE 2-continued

| Mode/Component status | Configuration 2 | |
|---|---|---|
| Roll control (Passive) | Method 1:<br>C3 = 0<br>C4 = 0<br>C5 = 0<br>C6 = 0<br>Pump is disabled | Method 2:<br>C3 = 1<br>C4 = 0<br>C5 = 0<br>C6 = 1<br>Pump is locked |
| Comfort mode | Method 1:<br>C3 = 1<br>C4 = 1<br>C5 = 0<br>C6 = 0<br>Pump is disabled | Method 2:<br>C3 = 1<br>C4 = 0<br>C5 = 0<br>C6 = 1<br>Pump is free running |
| Pressure control mode | Method 1:<br>C3 = 1<br>C4 = 1<br>C5 = 1<br>C6 = 0<br>Pump is enabled | |

Active suspension system 200 is also operable in an active roll control mode. Table 2 indicates selectively energizing hydraulic line 150 prime by opening third control valve 136' and sixth control valve 142'. Pump 144 transfers fluid from hydraulic line 150' to hydraulic line 152'. This energization scheme may correspond to providing roll control when the vehicle is making a right-hand turn. If it is desirable to operate active suspension system 200 in the active roll control mode during a left-hand turn, fourth control valve 138' is energized open and third control valve 136' is placed in the closed position.

Figure 15:
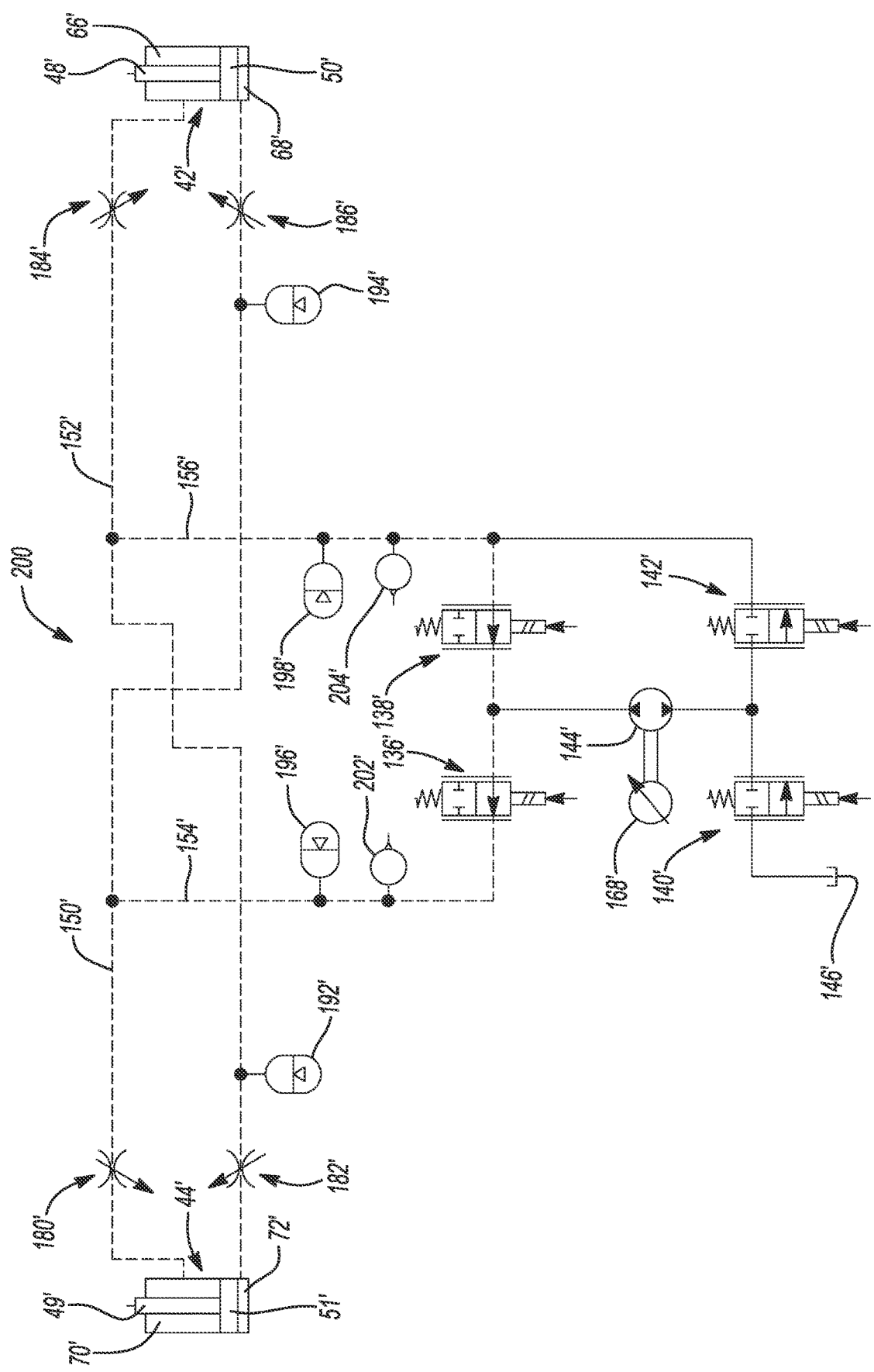
FIG. 15 is a schematic diagram illustrating the exemplary active suspension system illustrated in FIG. 14, where the active suspension system is configured to provide a comfort working mode.

FIG. 15 depicts active suspension system 200 operating in a first method of obtaining the comfort mode of operation. Third control valve 136' and fourth control valve 138' are placed in the open position to allow fluid to transfer between hydraulic line 150' and hydraulic line 152'. Pump 144' is not energized. Fluid may freely flow between left damper 44' and right damper 42'.

Figure 16:
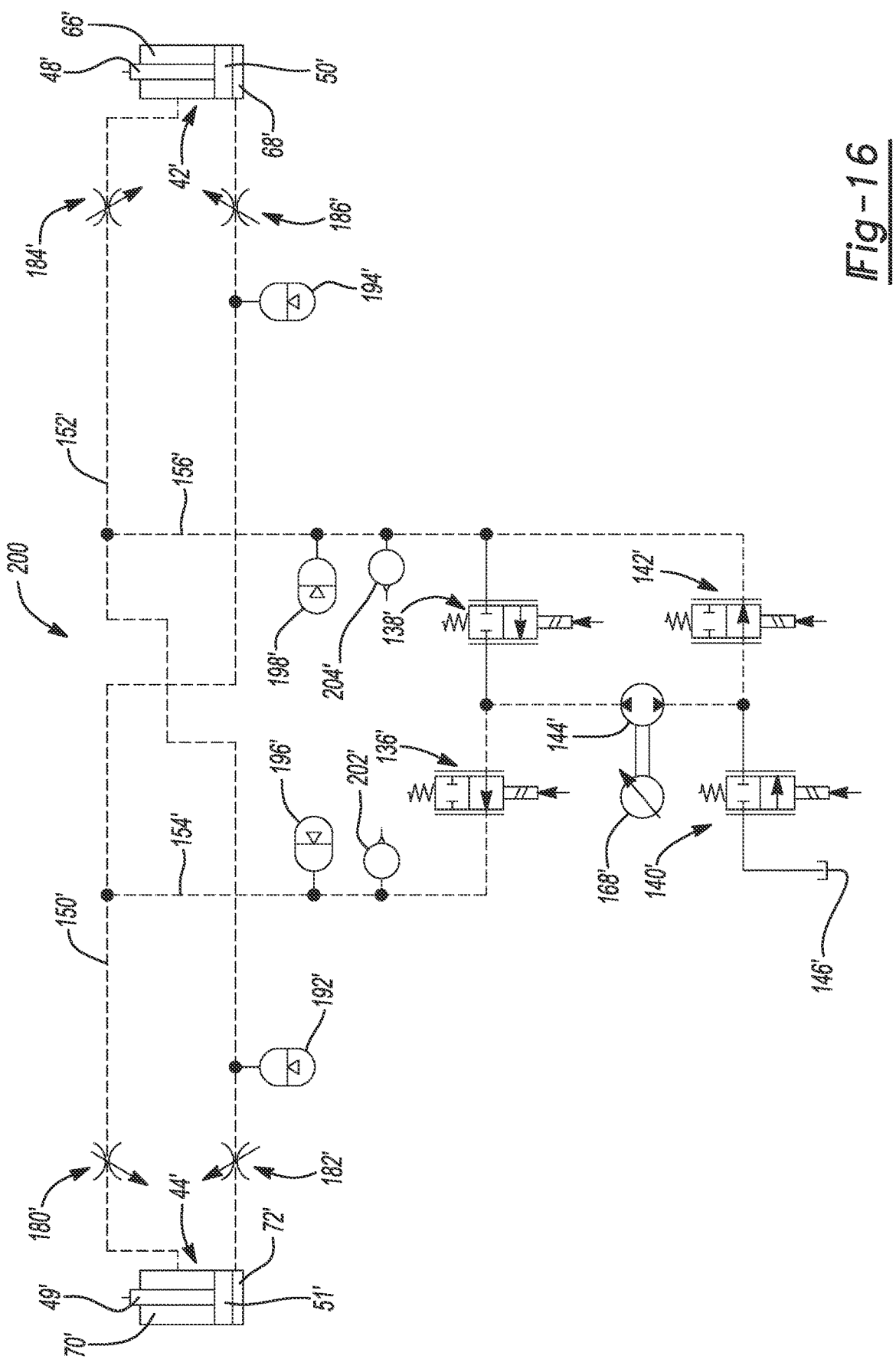
FIG. 16 is a schematic diagram illustrating the exemplary active suspension system illustrated in FIG. 14, where the active suspension system is configured to provide a comfort working mode.

A second method of operating active suspension system 200 in the comfort mode is shown in FIG. 16. Comfort mode operation is achieved by placing third control valve 136' in the open position, placing sixth control valve 142' in the open position, and allowing the internal components of pump 144' to move and allow fluid to pass through pump 144' while de-energized.

Figure 17:
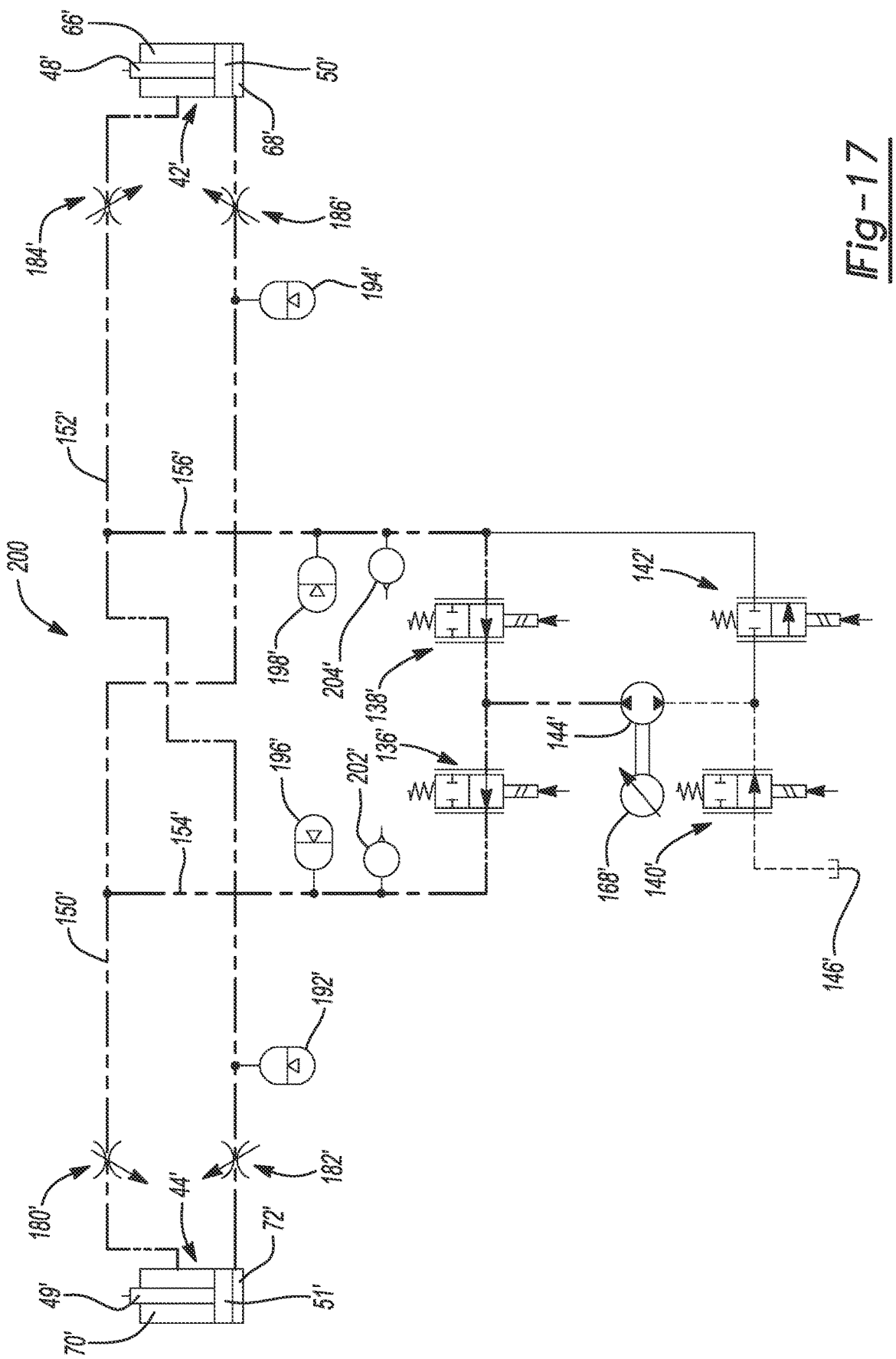
FIG. 17 is a schematic diagram illustrating the exemplary active suspension system illustrated in FIG. 14, where the active suspension system is configured to provide an alternate comfort working mode.

FIG. 17 represents active suspension system 200 operating in the pressure control mode. To charge or increase the static pressure within active suspension system 200, pump 144' is driven to draw low-pressure fluid from hydraulic fluid reservoir 146' and supply pressurized fluid to both hydraulic line 150' and hydraulic line 152'. To reduce the static pressure within active suspension system 200, the valve states remain the same as depicted in FIG. 17 but the pump 144' is driven in the opposite direction to transfer fluid from both hydraulic line 150' and hydraulic line 152' to hydraulic fluid reservoir 146'.

Figure 18:
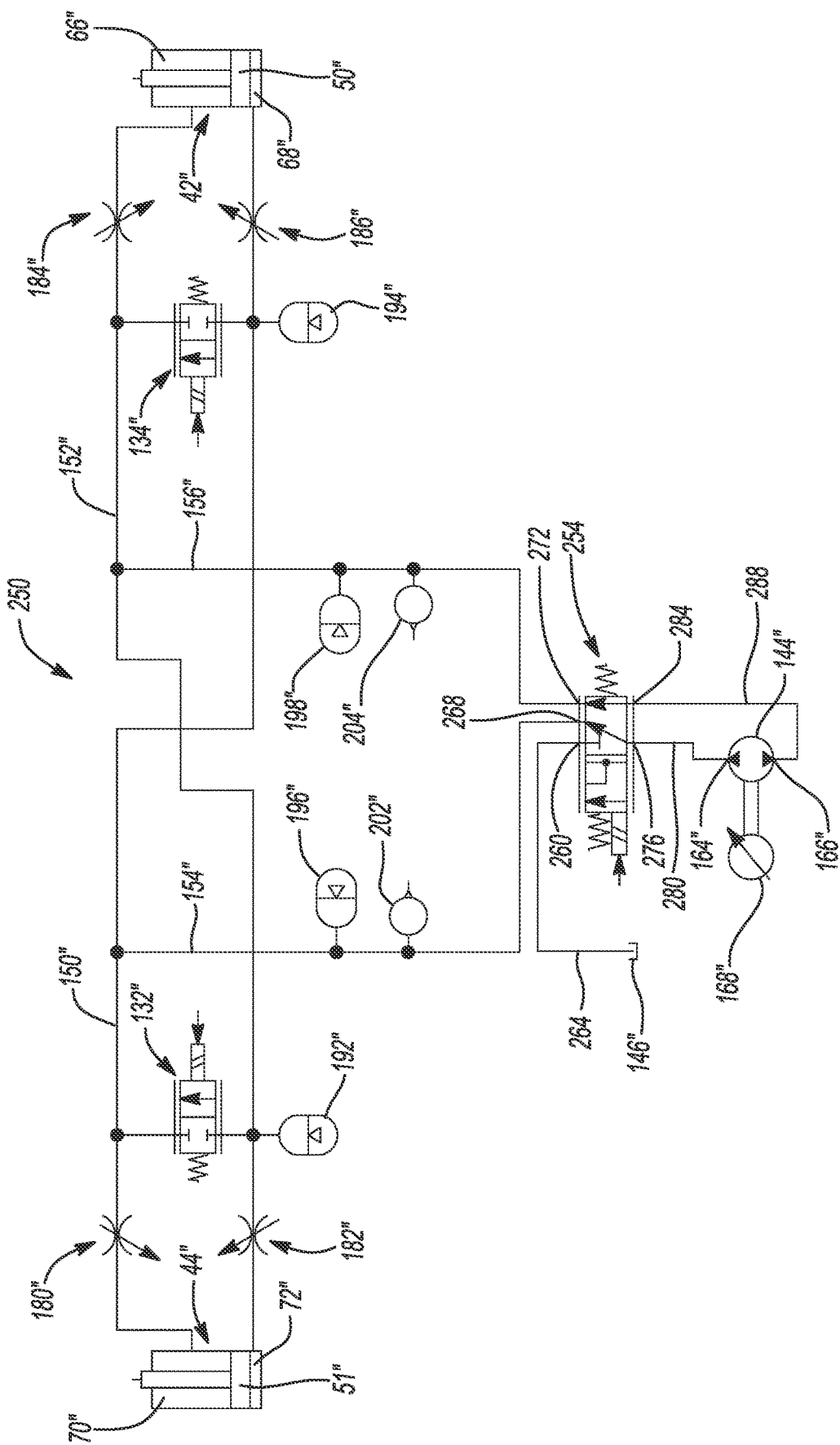
FIG. 18 is a schematic diagram illustrating another alternate active suspension system.

Another alternate active suspension system is identified at reference numeral 250 shown in FIG. 18. Active suspension system 250 utilizes only three directional control valves. Much of alternate active suspension system 250 includes common components to the suspension systems 130, 200 previously described in this paper. As such, like elements will retain their previously introduced reference numerals with a double prime suffix.

Active suspension system 250 includes a first control valve 132" and a second control valve 134". A two-position, five port, directional control valve 254 is also provided. Active suspension system 250 includes modified hydraulic line routing. On the top of directional control valve 254, as shown in FIG. 18, three ports are provided. A first port 260 is placed in fluid communication with hydraulic fluid reservoir 146" by a hydraulic line 264. Hydraulic line 154" interconnects a second port 268 of directional control valve 254 with hydraulic line 150". Hydraulic line 156" fluidly interconnects hydraulic line 152" with a third port 272 of directional control valve 254. On the bottom side of directional control valve 254, as depicted in FIG. 18, a fourth port 276 is fluidly coupled to pump port 164" via a hydraulic line 280. A fifth port 284 of directional control valve 254 is fluidly coupled to pump port 166" via a hydraulic line 288.

Figure 19:
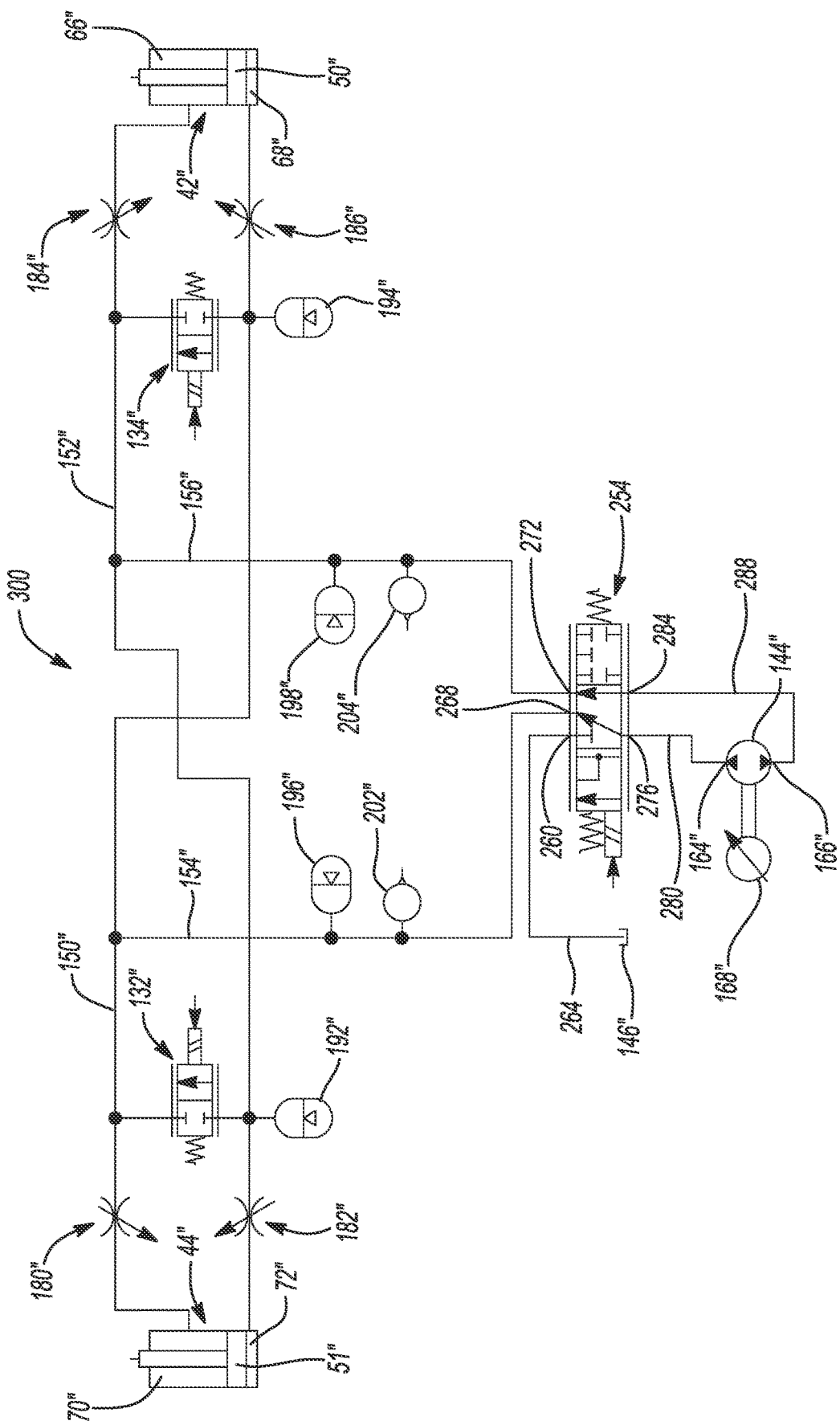
FIG. 19 is a schematic diagram illustrating another alternate active suspension system.

FIG. 19 depicts another alternate active suspension system at reference numeral 300. Active suspension system 300 is a minor variant to active suspension system 250 with directional control valve 254 being replaced with directional control valve 302. Directional control valve 302 is a three position, five port directional control valve. The first two positions are the same as previously described with relation to directional control valve 254. The third position has all ports blocked.

Table 3 provides a state diagram relating to active suspension system 250 shown in FIG. 18 (Configuration 3-1) as well as active suspension system 300 shown in FIG. 19 (Configuration 3-2). Interestingly, the active suspension systems 250, 300 may be configured without first control valve 132" and second control valve 134". Table 3 provides state diagram information for the alternate systems 250, 300 with and without the first and second control valves 132", 134" (without C1 & C2). In certain modes of operation, Table 3 indicates that the "pump is locked".

Any number of mechanical locking systems may be employed to restrict rotation of electric motor 168" or the internal components of pump 144" to prevent fluid from passing through pump 144". One arrangement includes having the pump function as an inerter. Alternatively, an electrical brake may be applied to electric motor 168" to restrict it and pump 144" from rotating. In yet another embodiment, the pump may be restricted from rotation by employing circuitry that causes electric motor 168" to function as a generator. Conversely, entries within Table 3 stating that the pump is free running indicate that internal components of pump 144" are allowed to move and allow fluid to pass through pump 144".

TABLE 3

| | Component status | | | |
|---|---|---|---|---|
| Mode | Configuration<br>3-1 with<br>C1&C2 | Configuration<br>3-1 without<br>C1&C2 | Configuration<br>3-2 with<br>C1&C2 | Configuration<br>3-2 without<br>C1&C2 |
| Roll control<br>(Active) | Method 1:<br>C1 = 0<br>C2 = 0 | Method 1:<br>DCV in position 2<br>Pump is enabled | Method 1:<br>C1 = 0<br>C2 = 0 | Method 1:<br>DCV in position 2<br>Pump is enabled |

TABLE 3-continued

| | Component status | | | |
|---|---|---|---|---|
| Mode | Configuration 3-1 with C1&C2 | Configuration 3-1 without C1&C2 | Configuration 3-2 with C1&C2 | Configuration 3-2 without C1&C2 |
| | DCV in position 2 Pump is enabled | | DCV in position 2 Pump is enabled | |
| Roll control (Passive) | Method 1: C1 = 0 C2 = 0 DCV in position 2 Pump is locked | Method 1: DCV in position 2 Pump is locked | Method 1: C1 = 0 C2 = 0 DCV in position 2 Pump is locked | Method 2: C1 = 0 C2 = 0 DCV in position 3 Pump is disabled | Method 1: DCV in position 2 Pump is locked | Method 2: DCV in position 3 Pump is disabled |
| Comfort mode | Method 1: C1 = 1 C2 = 1 DCV in position 2 Pump is free running | Method 1: DCV in position 2 Pump is free running | Method 1: C1 = 1 C2 = 1 DCV in position 2 Pump is free running | Method 2: C1 = 1 C2 = 1 DCV in position 3 Pump is disabled | Method 1: DCV in position 2 Pump is free running | |
| Pressure control mode | Method 1: C1 = 1 C2 = 1 DCV in position 1 Pump is enabled | Method 1: DCV in position 1 Pump is enabled | Method 1: C1 = 1 C2 = 1 DCV in position 1 Pump is enabled | | Method 1: DCV in position 1 Pump is enabled | |

Figure 20:
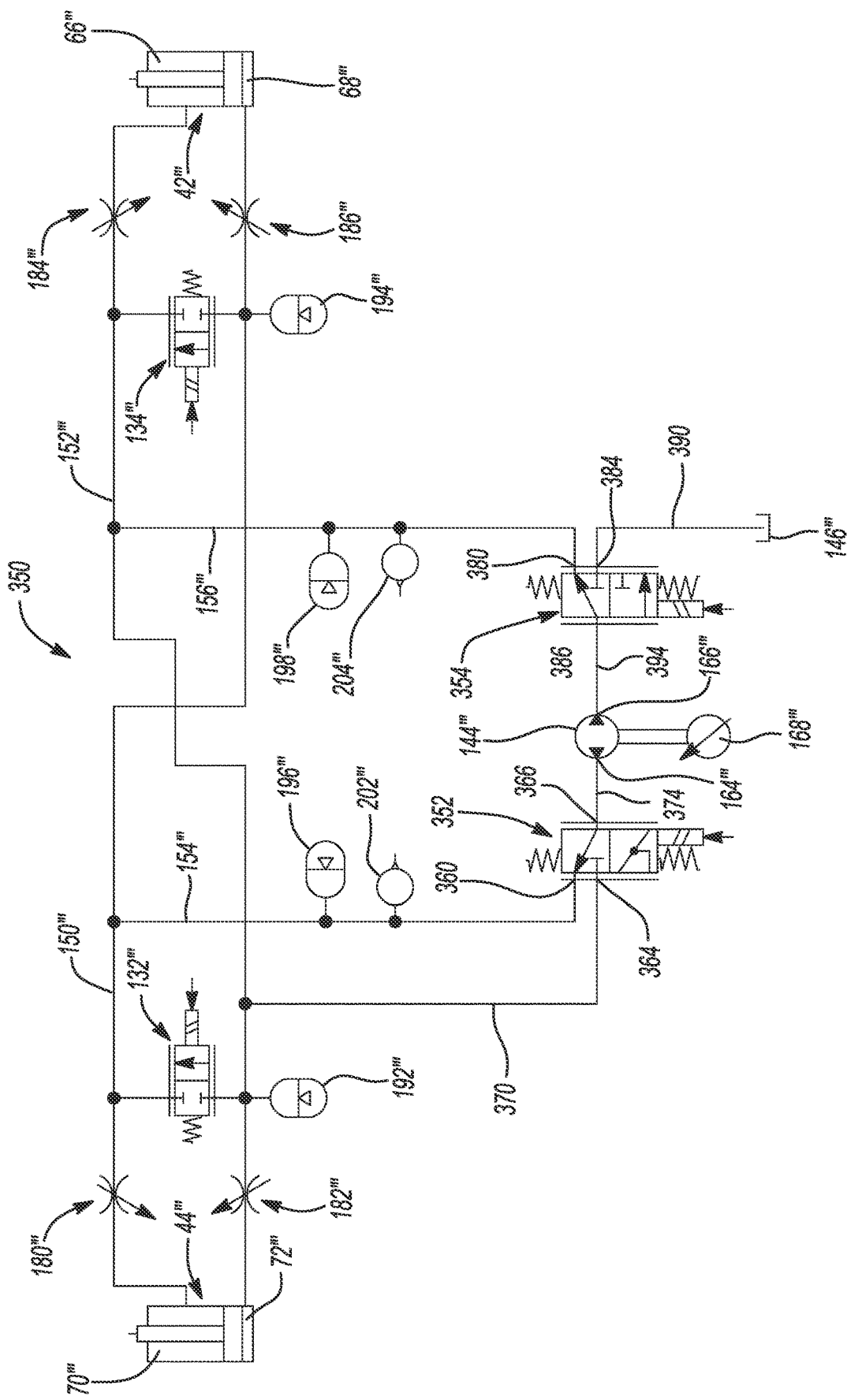
FIG. 20 is a schematic diagram illustrating another alternate active suspension system.

FIG. 20 depicts another alternate active suspension system identified at reference numeral 350 (Configuration 4-1). Active suspension system 350 replaces the four directional control valves having reference numerals 136, 138, 140, and 142 with a two position, three port directional control valve 352 and a two position, three port directional control valve 354. For consistency and ease of interpretation, previously discussed elements will retain their initial reference numerals and a triple prime suffix.

Directional control valve 352 includes a first port 360, a second port 364, and a third port 366. Hydraulic line 154''' interconnects hydraulic line 150''' with first port 360. A hydraulic line 370 interconnects hydraulic line 152''' with second port 364. A hydraulic line 374 interconnects third port 366 with 164''' of pump 144'''. Directional control valve 354 includes a first port 380, a second port 384, and a third port 386. Hydraulic line 156''' interconnects hydraulic line 152''' with first port 380. A hydraulic line 390 interconnects second port 384 with hydraulic fluid reservoir 146'''. A hydraulic line 394 interconnects third port 386 with pump port 166'''.

Active suspension system 350 may be operated in the various modes previously described. Table 4 provides the state diagram for operating the various control valves and pump to achieve the desired operating modes. It should be appreciated that active suspension system 350 may be configured with or without first control valve 132''' (C1) and second control valve 134''' (C2). Table 4 accounts for both systems. Active suspension system 350 may provide roll control by placing directional control valve 352 (DV1) and directional control valve 354 (DV2) in the second position. If present, first control valve 132''' in second control valve 134''' remain in the de-energized closed position. To achieve active roll control, pump motor 168''' is energized. To achieve passive roll control, pump 144''' is placed in a locked position to restrict flow through the pump.

TABLE 4

| Mode/Component status | Configuration 4-1 with C1&C2 | Configuration 4-1 without C1&C2 |
|---|---|---|
| Roll control (Active) | Method 1: C1 = 0 C2 = 0 DV1 in position 2 DV2 in position 2 Pump is enabled | Method 1: DV1 in position 2 DV2 in position 2 Pump is enabled |
| Roll control (Passive) | Method 1: C1 = 0 C2 = 0 DV1 in position 2 DV2 in position 2 Pump is locked | Method 1: DV1 in position 2 DV2 in position 2 Pump is locked |
| Comfort mode | Method 1: C1 = 1 C2 = 1 DV1 in position 2 DV2 in position 2 Pump is free running | Method 2: C1 = 1 C2 = 1 DV1 in position 1 DV2 in position 2 Pump is free running | Method 1: DV1 in position 2 DV2 in position 2 Pump is free running | Method 1: DV1 in position 1 DV2 in position 2 Pump is free running |

TABLE 4-continued

| Mode/Component status | Configuration 4-1 with C1&C2 | Configuration 4-1 without C1&C2 |
|---|---|---|
| Pressure control mode | Method 1:<br>C1 = 1<br>C2 = 1<br>DV1 in position 1<br>DV2 in position 1<br>Pump is enabled | Method 1:<br>DV1 in position 1<br>DV2 in position 1<br>Pump is enabled |

Active suspension system 350 may be operated in the comfort mode by placing first control valve 132''' and second control valve 134''' in the open position if so equipped. Directional control valve 352 and directional control valve 354 may both be placed in the second position or directional control valve 352 may be placed in position one while directional control valve 354 is placed in position two. Pump 144''' is de-energized and left in a free running mode. The pressure control mode may be provided by opening first control valve 132''' and second control valve 134''' as well as placing directional control valve 352 and directional control valve 354 in the first position. Static pressure within active suspension system 350 may be increased or decreased based on the direction in which pump 144''' is driven.

Figure 21:
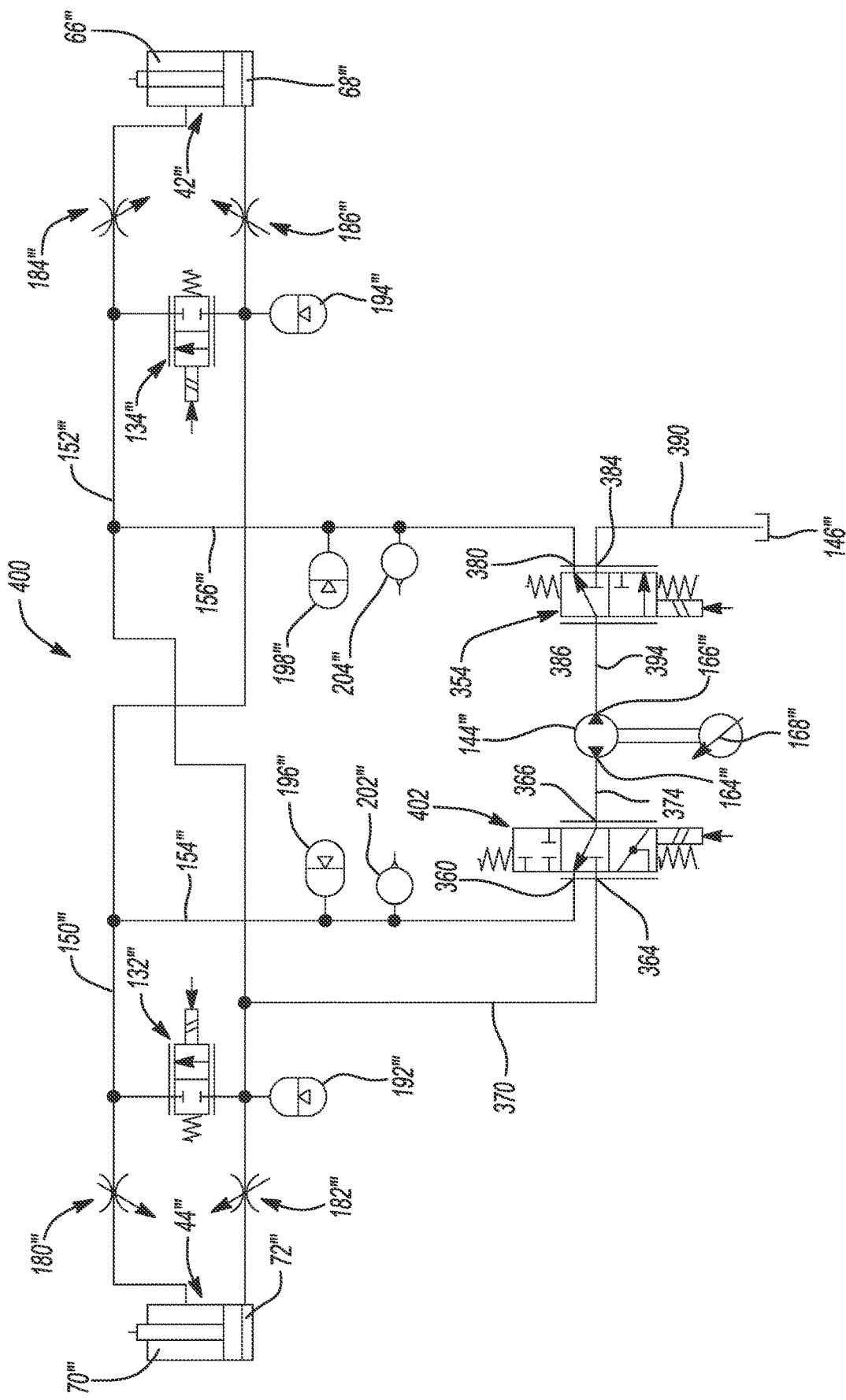
FIG. 21 is a schematic diagram illustrating another alternate active suspension system.

FIG. 21 illustrates another alternate embodiment suspension system 400. Active suspension system 400 is substantially similar to active suspension system 350 with the exception that a three position, three port directional control valve 402 replaces directional control valve 352. The third position on directional control valve 402 blocks all ports to disconnect the pump from hydraulic line 150''' and hydraulic line 152'''. Passive roll control may be achieved by utilizing the third position on directional control valve 402 without relying on a pump locking mechanism to restrict flow through pump 144'''. Table 5 illustrates the various states of valve and pump control to achieve desirable both operating active suspension system 400 (Configuration 4-2). Suspension system 400 may be configured with or without first control valve 132''' and second control valve 134''' as illustrated in Table 5.

TABLE 5

| Mode/Component status | Configuration 4-2 with C1&C2 | | Configuration 4-2 without C1&C2 | |
|---|---|---|---|---|
| Roll control (Active) | Method 1:<br>C1 = 0<br>C2 = 0<br>DV1 in position 2<br>DV2 in position 2<br>Pump is enabled | | Method 1:<br>DV1 in position 2<br>DV2 in position 2<br>Pump is enabled | |
| Roll control (Passive) | Method 1:<br>C1 = 0<br>C2 = 0<br>DV1 in position 2<br>DV2 in position 2<br>Pump is locked | Method 2:<br>C1 = 0<br>C2 = 0<br>DV1 in position 3<br>DV2 in position 2<br>Pump is disabled | Method 1:<br>DV1 in position 2<br>DV2 in position 2<br>Pump is locked | Method 2:<br>DV1 in position 3<br>DV2 in position 2<br>Pump is disabled |
| Comfort mode | Method 1:<br>C1 = 1<br>C2 = 1<br>DV1 in position 2<br>DV2 in position 2<br>Pump is free running | Method 2:<br>C1 = 1<br>C2 = 1<br>DV1 in position 1<br>DV2 in position 2<br>Pump is free running | Method 1:<br>DV1 in position 2<br>DV2 in position 2<br>Pump is free running | Method 2:<br>DV1 in position 1<br>DV2 in position 2<br>Pump is free running |
| Pressure control mode | Method 1:<br>C1 = 1<br>C2 = 1<br>DV1 in position 1<br>DV2 in position 1<br>Pump is enabled | | Method 1:<br>DV1 in position 1<br>DV2 in position 1<br>Pump is enabled | |

It should be appreciated that individual vehicle specifications and requirements will define the particular active control system implemented. Some of the components previously described may be omitted or replaced. For example, if the fluid fluctuations occurring within hydraulic line 154 and hydraulic line 156 exhibit a low enough magnitude, accumulators 196, 198 may be eliminated. Variable flow control valves 180, 182, 184, and 186 may be configured as semi-active hydraulic valves or conventional passive valves.

Figure 22:
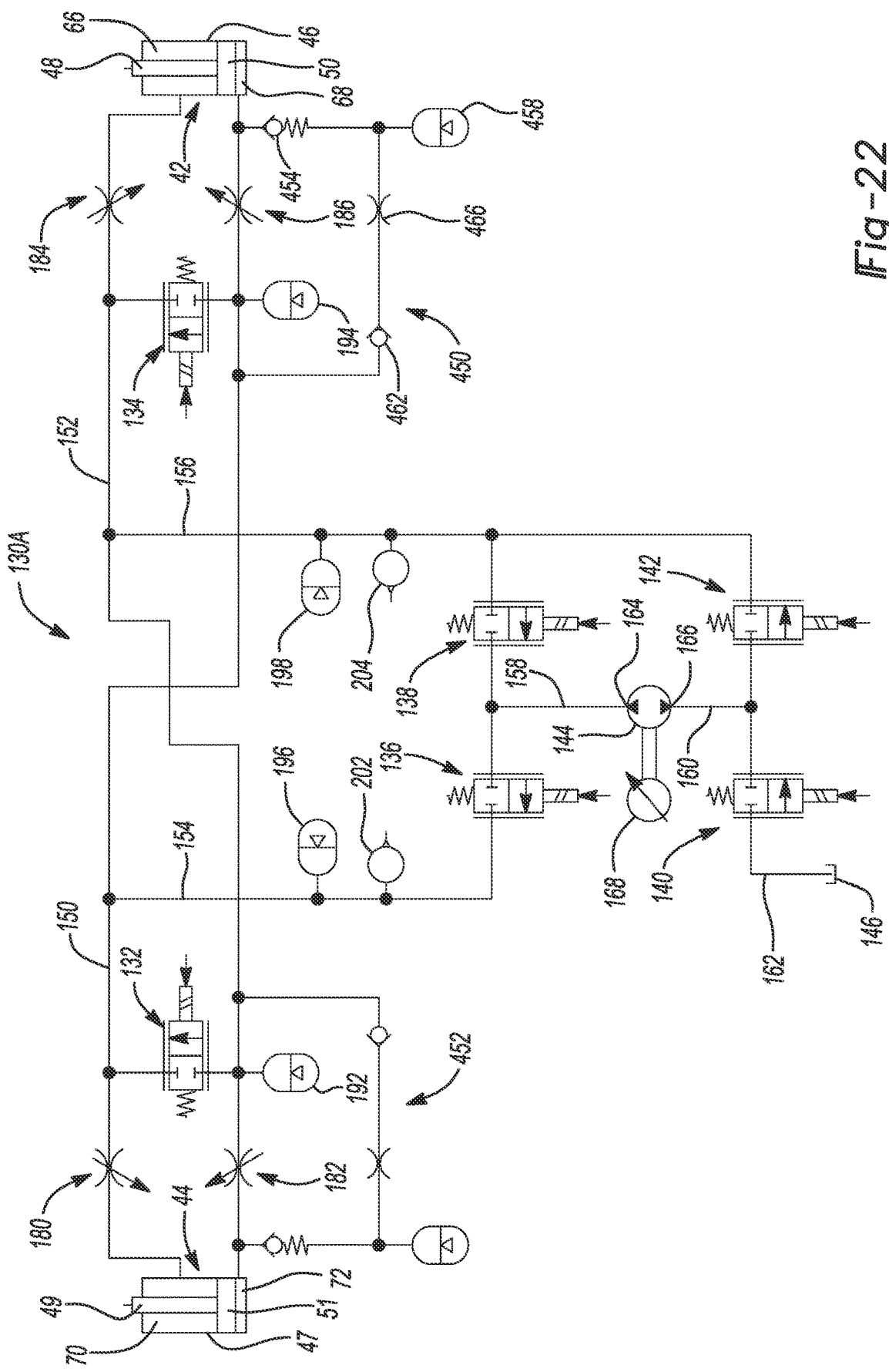
FIG. 22 is a schematic diagram illustrating another alternate active suspension system including a supplemental circuit.

FIG. 22 depicts a supplemental circuit 450 that may be added to any of the active suspension systems previously described. The figure shows active suspension system 130 (FIG. 8) modified and now identified as 130A to include supplemental circuit 450 and a similar supplemental circuit 452. Supplemental Circuits 450, 452 are individually operable to reduce single wheel stiffness at any given wheel to increase comfort. Supplemental circuit 450 includes a check valve 454 with a tunable crack pressure, an accumulator 458, a non-return check valve 462, and a flow control valve 466. Supplemental circuit 450 functions to allow fluid to flow to accumulator 458 immediately after the moment the front right wheel 24 is impacted by an obstacle or is affected by any variation in the ride surface leading to a pressure spike. Fluid exiting accumulator 458 flows through flow control valve 466 and check valve 462 to return to hydraulic line 150. Because a portion of the fluid rapidly exiting second working chamber 68 of right damper 42 passes through supplemental circuit 450, undesirable pressure spikes will not be transmitted to first working chamber 70 of left damper 44. As a result, single input stiffness is decreased and occupant comfort is increased.

It should also be appreciated that a suspension system as disclosed may be configured to offer all of the various modes and their respective functionalities or any combination of less than all of the modes and respective functionalities. By choosing among the combinations, suspension systems providers and vehicle manufacturers can make systems and vehicles available with different performance capabilities at different cost or pricing levels based on the chosen combination of available modes and functionalities. The availability of modes and respective functionalities can be determined by the structure of the system or by activation of modes and functionalities through software enablement. In the case of software enablement, the available modes and respective functionalities can be determined either during the manufacture of a vehicle with the suspension system, in connection with delivery of a vehicle to a purchaser (e.g. a dealer or consumer), or after delivery to a vehicle purchaser.

Many other modifications and variations of the present disclosure are possible in light of the above teachings and may be practiced otherwise than as specifically described while within the scope of the appended claims.

What is claimed is:

1. An active suspension system comprising:
   right and left dampers each including a damper housing, a piston rod, and a piston that is mounted on said piston rod and arranged in sliding engagement inside said damper housing such that said piston divides said damper housing into first and second working chambers;
   a pump including a pump intake and a pump outlet;
   a hydraulic reservoir; and
   a control valve system connected in fluid communication with said first and second working chambers of said right damper, said first and second working chambers of said left damper, said pump intake, said pump outlet, and said hydraulic reservoir,
   said control valve system having:
   a first arrangement of fluid flow paths wherein said pump intake is blocked from fluid communication with said hydraulic reservoir while said pump intake is in fluid communication with said first working chamber of said left damper and said second working chamber of said right damper, said pump outlet being in fluid communication with said first working chamber of said right damper and said second working chamber of said left damper; and
   a second arrangement of fluid flow paths wherein said pump intake is blocked from fluid communication with said hydraulic reservoir while in fluid communication with said first working chamber of said right damper and said second working chamber of said left damper, said pump outlet being in fluid communication with said first working chamber of said left damper and said second working chamber of said right damper, wherein for both of said first and second arrangements of fluid flow paths, said first working chamber of said right damper and said second working chamber of said left damper being fluidly isolated from second working chamber of said right damper and said first working chamber of said left damper.

2. The active suspension system set forth in claim 1, further comprising a third arrangement of fluid flow paths wherein said pump outlet is connected in fluid communication with said first working chambers of said right and left dampers and said second working chambers of said right and left dampers, said pump inlet being in fluid communication with said hydraulic reservoir.

3. The active suspension system set forth in claim 2, further comprising an accumulator in communication with said first working chamber of said right damper and said second working chamber of said left damper and being fluidly isolated from second working chamber of said right damper and said first working chamber of said left damper.

4. The active suspension system set forth in claim 1, wherein said pump is operable in a locked mode wherein fluid is restricted from flowing through the pump and a free running mode wherein fluid may pass through the pump regardless of the pump being energized or not.

5. An active suspension system comprising:
   right and left dampers each including a damper housing, a piston rod, and a piston that is mounted on said piston rod and arranged in sliding engagement inside said damper housing such that said piston divides said damper housing into first and second working chambers;
   a pump including a pump intake and a pump outlet; and
   a control valve system connected in fluid communication with said first and second working chambers of said right damper, said first and second working chambers of said left damper, said pump intake, and said pump outlet;
   said control valve system having:
   a first arrangement of fluid flow paths where said pump outlet is connected in fluid communication with said first working chambers of said right and left dampers and said second working chambers of said right and left dampers;
   a second arrangement of fluid flow paths where said pump outlet is fluidly isolated from said second working chambers of said right and left dampers and from said first working chambers of said right and left dampers;
   a third arrangement of fluid flow paths where said pump outlet is connected in fluid communication with said first working chamber of said left damper and said second working chamber of said right damper and is fluidly isolated from said first working chamber of said right damper and said second working chamber of said left damper; and
   a fourth arrangement of fluid flow paths where said pump outlet is connected in fluid communication with said first working chamber of said right damper and said second working chamber of said left damper and is fluidly isolated from second working chamber of said right damper and said first working chamber of said left damper.

6. The active suspension system set forth in claim 5, further comprising:
   a hydraulic reservoir connected in fluid communication with said control valve system.

7. The active suspension system set forth in claim 6, wherein said pump intake is connected in fluid communication with said hydraulic reservoir in said first arrangement of fluid flow paths.

8. The active suspension system set forth in claim 5, wherein said pump intake is connected in fluid communication with said first working chamber of said right damper and said second working chamber of said left damper in said third arrangement of fluid flow paths.

9. The active suspension system set forth in claim 5, wherein said pump intake is connected in fluid communication with said second working chamber of said right damper and said first working chamber of said left damper in said fourth arrangement of fluid flow paths.

10. The active suspension system set forth in claim 5, wherein, in said second arrangement of fluid flow paths, said first and second working chambers of said right damper are connected in fluid communication with one another and said first and second working chambers of said left damper are connected in fluid communication with one another.

11. The active suspension system set forth in claim 6, wherein said pump intake is blocked from fluid communication with said hydraulic reservoir in said second arrangement of fluid flow paths.

12. The active suspension system set forth in claim 5, wherein said control valve system includes a single valve body having five different operating positions defining each of the first, second, third and fourth arrangements of fluid flow paths.

13. The active suspension system set forth in claim 5, wherein the control valve system includes a first valve body, a separate second valve body, and a separate third valve body defining the first, second, third and fourth arrangements of fluid flow paths.

14. The active suspension system set forth in claim 5, further including a supplemental circuit in fluid communication with the control valve system, the supplemental circuit including an accumulator in one-way fluid communication with one of the second working chambers and a restricted outlet in fluid communication with the one of the first working chambers.

15. The active suspension system set forth in claim 5, wherein said pump is operable in a locked mode wherein fluid is restricted from flowing through the pump and a free running mode wherein fluid may pass through the pump regardless of the pump being energized or not.

16. An active suspension system comprising:
right and left dampers each including a damper housing, a piston rod, and a piston that is mounted on said piston rod and arranged in sliding engagement inside said damper housing such that said piston divides said damper housing into first and second working chambers;
a pump including a pump intake and a pump outlet;
a hydraulic reservoir; and
a control valve system connected in fluid communication with said first and second working chambers of said right damper, said first and second working chambers of said left damper, said pump intake, said pump outlet, and said hydraulic reservoir,
wherein said control valve system switches the active suspension system between an active roll control mode, a passive roll control mode, a pressure control mode, and a comfort mode, said active roll control mode including energizing said pump to provide pressurized fluid to said first working chamber of said right damper and said second working chamber of said left damper, said passive roll control mode including fluidly interconnecting said first working chamber of said right damper and said second working chamber of said left damper without energizing said pump.

* * * * *